US012731411B2

(12) United States Patent
Rahimi et al.

(10) Patent No.: US 12,731,411 B2
(45) Date of Patent: Sep. 8, 2026

(54) VERIFYING OBJECT CLASSIFICATION USING COMPONENT-BASED DESCRIPTORS AND TEMPORAL SIMILARITY MEASURES

(71) Applicant: HRL Laboratories, LLC, Malibu, CA (US)

(72) Inventors: Amir Rahimi, Santa Monica, CA (US); Hyukseong Kwon, Thousand Oaks, CA (US); Amit Agarwal, San Francisco, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 286 days.

(21) Appl. No.: 18/578,591

(22) PCT Filed: Jul. 8, 2022

(86) PCT No.: PCT/US2022/073573

§ 371 (c)(1),
(2) Date: Jan. 11, 2024

(87) PCT Pub. No.: WO2023/288186

PCT Pub. Date: Jan. 19, 2023

(65) Prior Publication Data

US 2024/0203131 A1 Jun. 20, 2024

Related U.S. Application Data

(60) Provisional application No. 63/224,216, filed on Jul. 21, 2021, provisional application No. 63/220,965, filed on Jul. 12, 2021.

(51) Int. Cl.
*G16H 15/00* (2018.01)
*G06V 10/764* (2022.01)
(Continued)

(52) U.S. Cl.
CPC ............ *G06V 20/58* (2022.01); *G06V 10/764* (2022.01); *G06V 10/776* (2022.01)

(58) Field of Classification Search
CPC ..... G06V 20/58; G06V 10/776; G06V 10/764
See application file for complete search history.

(56) References Cited

U.S. PATENT DOCUMENTS 11,334,767 B2 5/2022 Kwon et al.
2018/0286081 A1 10/2018 Koperski et al.
(Continued)

FOREIGN PATENT DOCUMENTS

WO 2021061875 A1 4/2021
WO 2023288186 A1 1/2023

OTHER PUBLICATIONS

P. Dendorfer et al.; "Tracking and Detection Challenge: How Crowded Can it Get?", Computer Science—Computer Vision and Pattern Recognition; http//arxiv.org/abs/1906.04567; 7 pages; Jun. 10, 2019.

(Continued)

*Primary Examiner* — David F Dunphy
(74) *Attorney, Agent, or Firm* — Wheatstone IP Law Corporation; Milad G. Shara

(57) ABSTRACT

A method and apparatus for verifying object classification includes comparing detected object-components with trained component-based descriptors and similarity measures to generate object classification verification data. The object classification verification data represents object classification confidence or misclassification errors to weight uncertainty for perception-based decision making. A sequence of similarity measures associated with a current frame and prior frames within a reference observation time
(Continued)

constraint are compared to a reference temporal similarity measure boundary to generate the object classification verification data.

30 Claims, 16 Drawing Sheets

(51) Int. Cl.

| | |
|---|---|
| ***G06V 10/776*** | (2022.01) |
| ***G06V 20/58*** | (2022.01) |
| ***G16H 10/60*** | (2018.01) |
| ***G16H 30/40*** | (2018.01) |
| ***G16H 50/20*** | (2018.01) |

(56) References Cited

U.S. PATENT DOCUMENTS

2018/0349785 A1 12/2018 Zheng et al.
2020/0380274 A1* 12/2020 Shin .......................... G06T 7/292
2021/0012116 A1* 1/2021 Urtasun .................... G06N 3/09

OTHER PUBLICATIONS

S. Kolouri et al,; "Sliced Wasserstein Distance for Learning Gaussian Mixture Models", Proceedings of the IEEE Conference on Computer Vision and Pattern Recognition; pp. 3427-3436; 2018.
A. Nguyen et al.; "Deep Neural Networks are Easily Fooled: High Confidence Predictions for Unrecognizable Images", Proceedings of the IEEE Conference on Computer Vision and Pattern Recognition; pp. 427-436; 2015.
D. Hoiem et al.; "Diagnosing Error in Object Detectors", Proceedings of 12th European Conference on Computer Vision; Springer, Berlin, Heidelberg; doi: 10.1007/978-3-642-33712-3_25; pp. 340-353; Oct. 7, 2012.
P. Scovanner et al.; "A 3-Dimensional SIFT Descriptor and its Application to Action Recognition", Proceedings of the 15th ACM International Conference on Multimedia; doi: 10.1145/1291233.1291311; pp. 357-360; Sep. 29, 2007.

* cited by examiner

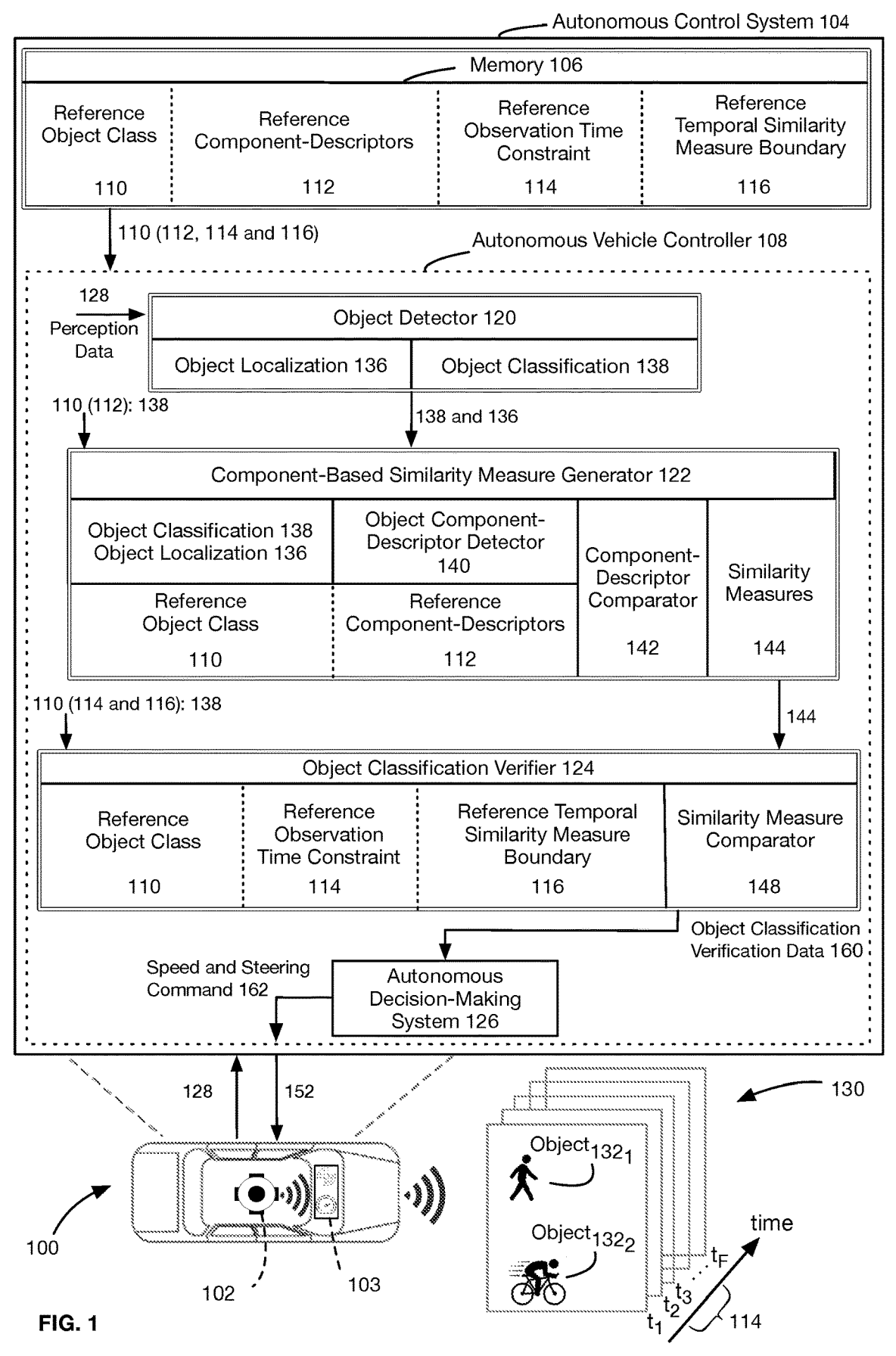

Autonomous Control System 104
Memory 106
Reference Object Class 110
Reference Component-Descriptors 112
Reference Observation Time Constraint 114
Reference Temporal Similarity Measure Boundary 116
110 (112, 114 and 116)
Autonomous Vehicle Controller 108
128 Perception Data
Object Detector 120
Object Localization 136
Object Classification 138
110 (112): 138
138 and 136
Component-Based Similarity Measure Generator 122
Object Classification 138
Object Localization 136
Object Component-Descriptor Detector 140
Component-Descriptor Comparator 142
Similarity Measures 144
Reference Object Class 110
Reference Component-Descriptors 112
110 (114 and 116): 138
144
Object Classification Verifier 124
Reference Object Class 110
Reference Observation Time Constraint 114
Reference Temporal Similarity Measure Boundary 116
Similarity Measure Comparator 148
Object Classification Verification Data 160
Speed and Steering Command 162
Autonomous Decision-Making System 126
128
152
130
Object $132_1$
Object $132_2$
time
$t_F$
$t_3$
$t_2$
$t_1$
114
100
102
103

FIG. 1

Memory 106

| Reference Object Class 110 | Reference Component-Descriptors 112 | Reference Observation Time Constraint 114 | Reference Temporal Similarity Measure Boundary 116 |
|---|---|---|---|
| Reference Object Class $110_1$ | Reference Component-Descriptors $112_1$<br>$112_1.1$ \| $112_1.2$ \| . . . \| $112_1.N_1$<br>$112embedding\_protocol_1$ | Reference Observation Time Constraint<br>$114_1$<br>($tstart_1$, $tend_1$) | Reference Temporal Similarity Measure Boundary<br>$116_1$ |
| Reference Object Class $110_2$ | Reference Component-Descriptors $112_2$<br>$112_2.1$ \| $112_2.1$ \| . . . \| $112_2.N_2$<br>$112embedding\_protocol_2$ | Reference Observation Time Constraint<br>$114_2$<br>($tstart_2$, $tend_2$) | Reference Temporal Similarity Measure Boundary<br>$116_2$ |
| ⋮ | ⋮ | ⋮ | ⋮ |
| Reference Object Class $110_M$ | Reference Component-Descriptors $112_m$<br>$112_M.1$ \| $112_M.1$ \| . . . \| $112_M.N_M$<br>$112embedding\_protocol_M$ | Reference Observation Time Constraint<br>$114_M$<br>($tstart_M$, $tend_M$) | Reference Temporal Similarity Measure Boundary<br>$116_M$ |

FIG. 2

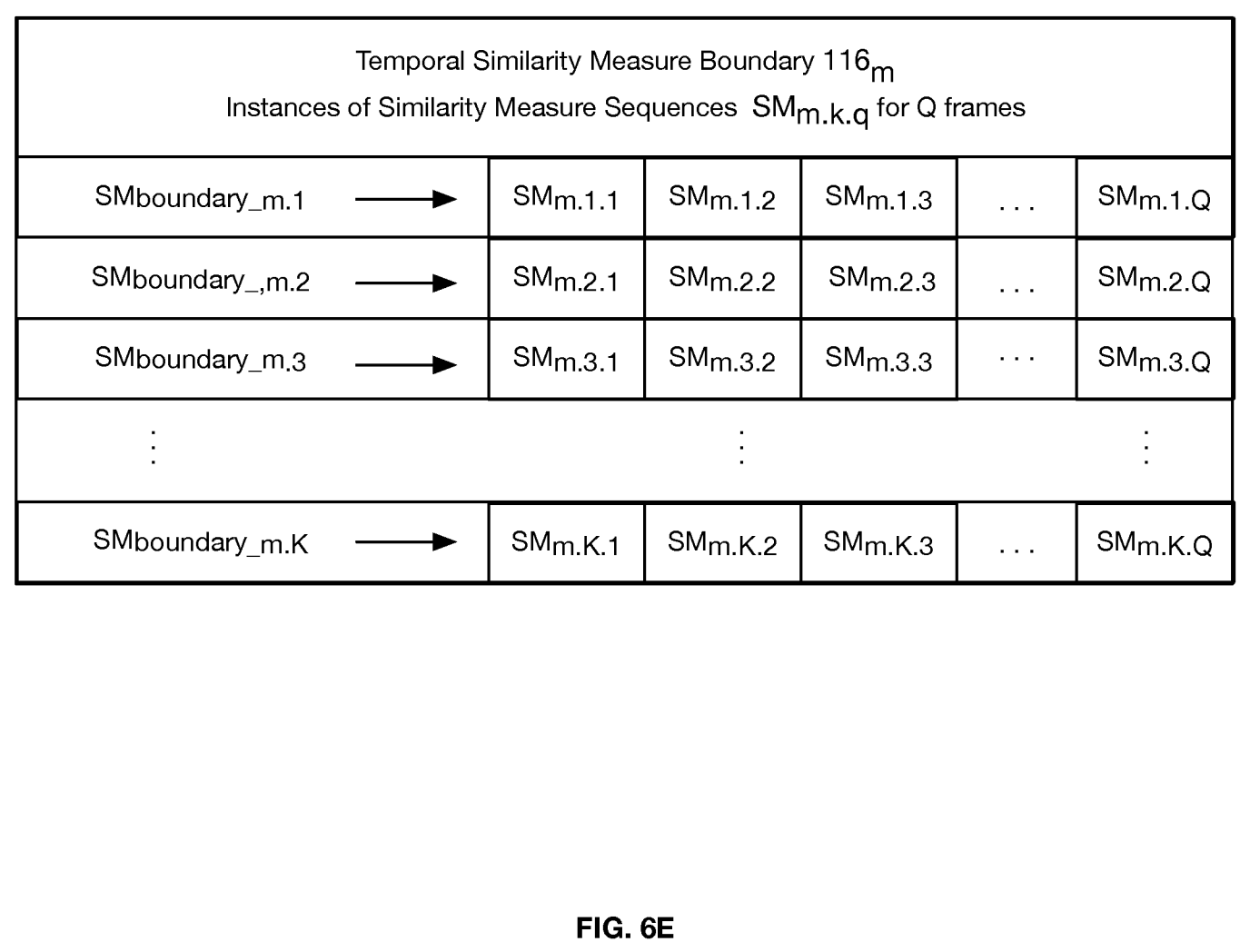

Temporal Similarity Measure Boundary $116_m$

Instances of Similarity Measure Sequences $SM_{m.k.q}$ for Q frames

| | | | | | |
|---|---|---|---|---|---|
| SMboundary_m.1 → | $SM_{m.1.1}$ | $SM_{m.1.2}$ | $SM_{m.1.3}$ | . . . | $SM_{m.1.Q}$ |
| SMboundary_,m.2 → | $SM_{m.2.1}$ | $SM_{m.2.2}$ | $SM_{m.2.3}$ | . . . | $SM_{m.2.Q}$ |
| SMboundary_m.3 → | $SM_{m.3.1}$ | $SM_{m.3.2}$ | $SM_{m.3.3}$ | . . . | $SM_{m.3.Q}$ |
| ⋮ | | ⋮ | | | ⋮ |
| SMboundary_m.K → | $SM_{m.K.1}$ | $SM_{m.K.2}$ | $SM_{m.K.3}$ | . . . | $SM_{m.K.Q}$ |

FIG. 6E

VERIFYING OBJECT CLASSIFICATION USING COMPONENT-BASED DESCRIPTORS AND TEMPORAL SIMILARITY MEASURES

CROSS-REFERENCE TO RELATED APPLICATIONS

The present application claims priority to U.S. Provisional Application No. 63/220,965 entitled VERIFYING OBJECT CLASSIFICATION USING COMPONENT-BASED DESCRIPTORS AND TEMPORAL SIMILARITY MEASURES, filed on Jul. 12, 2021, the entirety of which is hereby incorporated by reference, and U.S. Provisional Application No. 63/224,216 entitled VERIFYING OBJECT CLASSIFICATION USING COMPONENT-BASED DESCRIPTORS AND TEMPORAL SIMILARITY MEASURES, filed on Jul. 21, 2021, the entirety of which is hereby incorporated by reference.

TECHNICAL FIELD

This specification relates to object detection in perception systems.

BACKGROUND

Object detection systems are designed in machine structures for autonomous vehicles and autonomous security systems. For example, autonomous automotive vehicles include control systems responsive to object detection with a perception system for identifying and localizing encountered objects, and a maneuvering system that utilizes the information from the perception system to enable the vehicle to drive safely. Autonomous aircraft vehicles include control systems responsive to vision-based object classification for above-wing and below-wing autonomy. Autonomous airport security systems include control systems responsive to image-based perception systems for autonomous security.

Many object detection systems are based on Deep Neural Network (DNN) architectures that can exhibit errors due to network bias or small perturbations in the perceived data received from a sensor that scans for objects in a target environment. A significant portion of DNN errors result from the misclassification of detected objects. These classification errors can lead to false detections, which introduces uncertainty and errors such as in safe maneuvering of an autonomous vehicle.

DESCRIPTION OF DRAWINGS

FIG. 1 is a diagram of an example autonomous vehicle having an autonomous control system that includes an autonomous vehicle controller which verifies object classification using component-based descriptors and temporal similarity measures, according to one embodiment.

FIG. 2 is a diagram illustrating the memory of FIG. 1 including a set of reference object classes, each reference object class having a set of reference component-descriptors, a reference observation time constraint, and a reference temporal similarity measure boundary, according to one embodiment.

FIG. 3A is a diagram illustrating an example embodiment of the object detector that includes a confidence value threshold for transmitting the object classification associated with the detected object to the component-similarity measure generator of FIG. 3B.

FIG. 3B is a diagram illustrating an example embodiment of the component-based similarity measure generator responsive to the object classification having a pedestrian label for comparing object component-descriptors with the reference component-descriptors to generate a similarity measure in a sequence of similarity measures provided to the object classification verifier of FIG. 3C.

FIG. 3C is a diagram illustrating an example embodiment of the object classification verifier that compares the sequence of similarity measures within the reference observation time constraint to the reference temporal similarity measure boundary for generating object classification verification data associated with the object classification having the pedestrian label at the current frame.

FIG. 3D is a diagram illustrating an example embodiment of the component-based similarity measure generator responsive to the object classification having a car label for comparing object component-descriptors with the reference component-descriptors to generate a similarity measure in a sequence of similarity measures provided to the object classification verifier of FIG. 3E.

FIG. 3E is a diagram illustrating an example embodiment of the object classification verifier that compares the sequence of similarity measures within the reference observation time constraint to a reference temporal similarity measure boundary for generating object classification verification data associated with the object classification having the car label at the current frame.

FIGS. 6A, 6B, 6C, 6D and 6E are method diagrams illustrating an example embodiment training component-based descriptors and temporal similarity measures for post-processing a perception system or an object detector output to verify object classifications:

FIG. 6A is a flow chart illustrating an example training process for learning reference component-descriptors and validating a reference time constraint for a reference temporal similarity measure boundary associated with each object class in a set of reference object classes for component-based temporal verification to verify classification or detect misclassification in perception systems or object detectors.

FIG. 6B is a flow chart illustrating an example process for generating the reference component descriptors in the training process of FIG. 6A.

FIG. 6C is a flow chart illustrating an example process for determining the reference similarity measure threshold in the training process of FIG. 6A.

FIG. 6D. is a flow chart illustrating an example process for validating the reference observation time constraint in the training process of FIG. 6A.

FIG. 6E is a table illustrating instances of similarity measure sequences within the reference temporal similarity measure boundary developed in the training process of FIG. 6D.

Like reference symbols in the various figures indicate like elements.

DETAILED DESCRIPTION

Figure 3A:
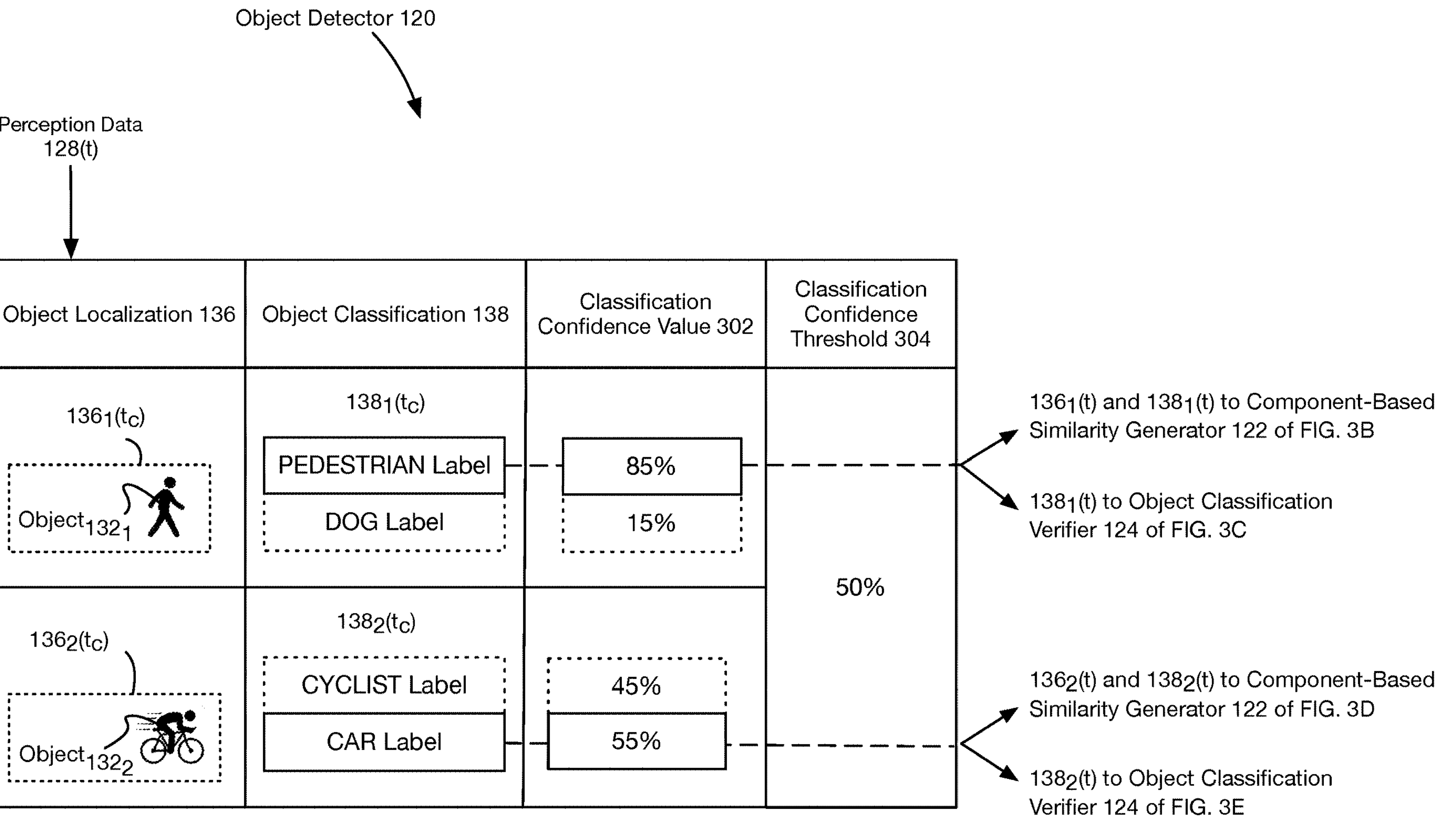
FIGS. 3A, 3B, 3C, 3D and 3E are diagrams illustrating an example embodiment of the autonomous vehicle controller in the autonomous vehicle of FIG. 1.

FIGS. 1-8 illustrate example embodiments of trained component-based descriptor and similarity measure parameters for post-processing an object detector output in any perception system to verify object classifications that reflect true detections or identify object misclassification errors that reflect false detections. For example, the trained component-based descriptors and similarity measures may be configured in (i) autonomous surface vehicles for safe steering and speed control decision making, (ii) autonomous aerial vehicles for above-wing and below-wing autonomy (such as above-wing autonomy in accurate passenger and crew detection for safety monitoring and below-wing autonomy in accurate vehicle detections and safe maneuvering in airport taxiways), and (iii) aviation security systems for accurate airport terminal surveillance. The illustrated example embodiments include comparing detected object-components with trained component-based descriptors and similarity measures to generate object classification verification data such as object classification confidence or misclassification errors to weight uncertainty for perception-based decision making.

FIG. 1 is a diagram of an example autonomous vehicle 100 that may include a sensor 102, a speed and steering control system 103, and an autonomous vehicle control system 104, according to one embodiment.

Sensor 102 provides perception data 128 that captures images 130 of a detected object 132, such as detected pedestrian object 1321 or detected cyclist object 132$_2$, in an environment surrounding or in proximate vicinity to the vehicle 100 during a sequence of time intervals $t_1$ to $t_F$, where the subscript F represents the total number of frames that include detected object 132 in captured images 130. For example, sensor 102 such as a camera sensor may generate a video signal for providing perception data 128 having a sequence of frames representing captured images 130 of detected pedestrian object 1321 or detected cyclist object 132$_2$ during the sequence of time intervals $t_1$ to $t_F$. The sequence of frames from captured images 130 are associated with a current frame $$f_t^c$$

and prior frames within the sequence of time intervals $t_1$ to $t_F$.

Sensor 102 may utilize other sensor modalities such as lasers, sonar, radar, and light detection and ranging (LiDAR) sensors that scan and record data from objects surrounding autonomous vehicle 100 to provide perception data 128. In one embodiment, a measurement for the sequence of frames representing captured images 130 may be a predetermined time interval between frames such as every millisecond, every second, or may be a number of frames in a predetermined time interval such as 10 frames per second.

Autonomous vehicle control system 104 may include a memory 106 and an autonomous vehicle controller 108. In one embodiment, memory 106 may be integrated in autonomous vehicle controller 108. Memory 106 may include a reference object class 110 that represents an object class associated with detected object 132, such as detected pedestrian object 1321 or detected cyclist object 132$_2$. Reference object class 100 has associated reference parameters which include reference component-descriptors 112, a reference observation time constraint 114, and a reference temporal similarity measure boundary 116. Reference object class 110 with its associated reference parameters may be determined from neural network or machine learning model training such as the training illustrated in FIGS. 6A-6E, and may be provided by a wired or wireless connection to autonomous vehicle control system 104.

Autonomous vehicle controller 108 may include an object detector 120, a component-based similarity measure generator 122, an object classification verifier 124, and an autonomous decision-making system 126.

Object detector 120 is responsive to images 130 for identifying an object localization 136 of detected object 132, such as detected pedestrian object 132$_1$ or detected cyclist object 132$_2$, and generating an object classification 138 associated with object localization 136 at each frame in the sequence of time intervals of $t_1$ to $t_F$. For example, object detector 120 generates object localization 136 with an associated object classification 138 for each detected object 132, such as detected pedestrian object 132$_1$ or detected cyclist object 132$_2$, that is identified and localized in a captured image of images 130 during each time frame in the sequence of time intervals of $t_1$ to $t_F$. Object localization 130 may define a bounding box centered on detected pedestrian object 132$_1$, and another bounding box centered on detected cyclist object 132$_2$.

Component-based similarity measure generator 122 may be configured to generate a sequence of similarity measures 144 associated with the sequence of time intervals of $t_1$ to $t_F$. The component-based similarity measure generator 122 may be responsive to object classification 138 and object localization 136 at each frame in the sequence of time intervals $t_1$ to $t_F$ for (i) generating object component-descriptors 140 and (ii) comparing object component-descriptors 140 with reference component-descriptors 112 to generate each similarity measure in the sequence of similarity measures 144. In one embodiment, component-based similarity measure generator 122 associates object classification 138 with reference object class 110 to determine component-descriptors 140 from object localization 136, and to generate a similarity measure (in the sequence of similarity measures 144) which compares object component-descriptors 140 with reference component-descriptors 112 at each frame in the sequence of time intervals $t_1$ to $t_F$. For example, each similarity measure in the sequence of similarity measures 144 may represent a difference or distance measure between object component-descriptors 140 and reference component-descriptors 112. Component-based similarity measure generator 122 may include a buffer for storing the sequence of similarity measures 144. Alternatively, object classification verifier 124 may include a buffer for storing sequence of similarity measures 144.

Object classification verifier 124 compares the sequence of similarity measures 144 generated within reference observation time constraint 114 to reference temporal similarity measure boundary 116 for generating object classification verification data 160 associated with object classification 138. Object classification verifier 124 may be configured to be responsive to object classification 138 for selecting reference observation time constraint 114 and reference temporal similarity measure boundary 116 associated with reference object class 110 having an object class that is the same an object class associated with object classification 138. Object classification verification data 160 may represent validity or error measure associated with object classification 138 from object detector 120.

Autonomous decision-making system 126, according to one embodiment, may be responsive to object classification verification data 160 for generating a decision-making command 162. Speed and control system 103 is responsive to decision-making command 162 to autonomously maneuver autonomous vehicle 100. For example, decision-making command 162 may include steering and speed controls for safe maneuvering in response to object classification verification data 160.

FIG. 2 illustrates an example memory 106 of FIG. 1. Memory 106 may include a set of reference object classes $\mathbf{110}_1$ to $\mathbf{110}_M$. Each reference object class $\mathbf{110}_m$ in the set of reference object classes $\mathbf{110}_1$ to $\mathbf{110}_M$ has a (i) set of reference component-descriptors $\mathbf{112}_{m.1}$ to $\mathbf{112}_{m.Nm}$, (ii) a reference observation time constraint $\mathbf{114}_m$ ($t_{start\_m}$, $t_{end\_m}$), and (iii) a reference temporal similarity measure boundary $\mathbf{116}_m$ associated with reference object class $\mathbf{110}_m$.

Reference object class $\mathbf{110}_m$ refers to the $m^{th}$ reference object class $\mathbf{110}_m$ in the set of reference object classes $\mathbf{110}_1$ to $\mathbf{110}_M$, for m=1 to M where M is the total number of reference object classes. The $m^{th}$ set of reference component-descriptors $\mathbf{112}_{m.1}$ to $\mathbf{112}_{m.Nm}$ include Nm reference component-descriptors, where the number of Nm reference component-descriptors may depend on characteristics of an object class such as a pedestrian or cyclist associated with reference object class $\mathbf{110}_m$.

In one embodiment, reference object class $\mathbf{110}_m$ may be selected in response to object classification 138 generated by object detector 120 of FIG. 1 having an object classification label that corresponds to the object class associated with the selected reference object class $\mathbf{110}_m$. For example, component-based similarity generator 122 is responsive to an object classification label associated with object classification 138 for selecting a reference object class $\mathbf{110}_m$ from the set of reference object classes $\mathbf{110}_1$ to $\mathbf{110}_M$. The set of reference component-descriptors $\mathbf{112}_{m.1}$ to $\mathbf{112}_{m.Nm}$ may define components such as component characteristics of an object classification label associated with object classification 138. Also, the reference component-descriptors $\mathbf{112}_{m.1}$ to $\mathbf{112}_{m.Nm}$ may include a reference embedding space mapping protocol $\mathbf{112}_{embedding\_protocol\_m}$ for generating object component-descriptors that define identified components from object localization 136 associated with the object classification 138.

Reference component-descriptors $\mathbf{112}_{m.1}$ to $\mathbf{112}_{m.Nm}$ may include (i) a histogram of Nm reference component-descriptors $\mathbf{112}_{m.1}$ to $\mathbf{112}_{m.Nm}$ that correspond to Nm reference component cluster centroids in a reference embedding space associated with reference object class $\mathbf{110}_m$ and (ii) a reference embedding space mapping protocol $\mathbf{112}_{embedding\_protocol\_m}$ associated with generating the histogram of Nm reference component-descriptors $\mathbf{112}_{m.1}$ to $\mathbf{112}_{m.Nm}$. Also, reference embedding space mapping protocol $\mathbf{112}_{embedding\_protocol\_m}$ may be used for generating a set of object component-descriptors from the object localization 136 associated with the object classification 138 in FIG. 1. The set of object component-descriptors include a histogram of Nm object component-descriptors that correspond to N object component locations in the reference embedded space associated with the reference object class $\mathbf{110}_m$.

Each reference embedding space mapping protocol $\mathbf{112}_{embedding\_protocol\_m}$ may include, according to one embodiment, neural network architecture design hyperparameters and associated weights that are determined during training of reference component descriptors $\mathbf{112}_{m.1}$ to $\mathbf{112}_{m.Nm}$ for an object class associated with reference object class $\mathbf{110}_m$. For example, the neural network architecture design hyperparameters and associated weights may be used to configure neural network architecture in component-based similarity measure generator 122 of FIG. 1.

Reference observation time constraint $\mathbf{114}_m$($t_{start\_m}$, $t_{end\_m}$) includes an observation start time $t_{start\_m}$ and an observation end time $t_{end\_m}$ which may define the current frame and prior frames within the sequence of time intervals $t_1$ to $t_F$ for an observation of sequence of similarity measures 144 associated with object localization 136 and object classification 138 in FIG. 1.

Reference temporal similarity measure boundary $\mathbf{116}_m$ represents performance characteristics from reference similarity measure sequences within Q m frames during reference observation time constraint $\mathbf{114}_m$ ($t_{start\_m}$, $t_{end\_m}$) associated with reference object class $\mathbf{110}_m$. For example, the reference similarity measure sequences are learned during a training process such as illustrated in FIGS. 6A-6E, and the performance characteristics reflect verified object classification characteristics for instances of generated similarity measure sequences within $Q_m$ frames during reference observation time constraint $\mathbf{114}_m$ ($t_{start\_m}$, $t_{end\_m}$). The number of $Q_m$ frames associated with the reference similarity measure sequence is determined from the duration of reference observation time constraint $\mathbf{114}_m$ ($t_{start\_m}$, $t_{end\_m}$) associated with reference object class $\mathbf{110}_m$.

The similarity measure may be an earth mover distance (EMD) measure. For example, an EMD measure represents an amount of work needed to transform one distribution into another distribution when measuring distance in an embedded space between components that belong to the same object type. In alternate embodiments, other distribution-based distances (such as Wasserstein distance, or any other similarity measures such as L1 norm and L2 norm distances) may also be used where the distance between components that belong to the same object type should be a low distance to provide a measure of uncertainty or certainty when verifying object classification from an object detector.

FIGS. 3A to 3E illustrate an embodiment of autonomous vehicle control system 104 in autonomous vehicle 100 of FIG. 1.

Referring to the embodiment of FIG. 3A, object detector 120 includes a classification confidence threshold 304, and receives perception data 128 to generate a classification confidence value 302 associated with object classification 138 and to transmit object classification 138 to component-based similarity measure generator 122 when classification confidence value 302 satisfies classification confidence threshold 304.

Classification confidence value 302 represents a confidence measure of objection classification 138 associated with object localization 136. Classification confidence threshold 302 may be set at a threshold value for determining whether to provide object classification 138 with its associated object localization 136 to component-based similarity measure generator 122, and to provide object classification 138 to object classification verifier 124. That is, when classification confidence value 320 is below the threshold value of classification confidence threshold 304, object classification 138 with its associated object localization 136 is not provided to component-based similarity measure generator 122. Conversely, when classification confidence value 302 is at or above the threshold value of classification confidence threshold 304, object classification 138 with its associated object localization 136 is provided to component-based similarity measure generator 122 and object classification 138 is provided to object classification verifier 124.

For example, object detector 120 may be configured with classification confidence threshold 304 at 50%, and receives perception data 128($t$) having a captured image of detected pedestrian object $\mathbf{132}_1$ and detected cyclist object $\mathbf{132}_2$ at a current frame $$f_t^c$$

in the sequence of time intervals of $t_1$ to $t_F$:

A. Detected Pedestrian Object $\mathbf{132}_1$. For detected Pedestrian Object $\mathbf{132}_1$, object detector 120 identifies and localizes detected pedestrian object $\mathbf{132}_1$ in object localization $\mathbf{136}_1(t_c)$ with (i) an associated object classification $\mathbf{138}_1(t_c)$ representing a PEDESTRIAN label having 85% confidence value at classification confidence value 302, which satisfies the 50% threshold value at classification confidence threshold 302 and (ii) another object classification $\mathbf{138}_1(t_c)$ representing a DOG label having 15% confidence value at classification confidence value 302, which does not satisfy the 50% threshold at classification confidence threshold 302. Accordingly, object classification $\mathbf{138}_1(t_c)$ having the PEDESTRIAN label together with its associated object localization $\mathbf{136}_1(t_c)$ that identified and localized detected pedestrian object $\mathbf{132}_1$ are provided to component-based similarity measure generator 122 of FIG. 3B. Also, object classification $\mathbf{138}_1(t_c)$ having the PEDESTRIAN label is provided to object classification verifier of FIG. 3C.

B. Detected Cyclist Object $\mathbf{132}_2$. For detected cyclist object $\mathbf{132}_2$, object detector 120 identifies and localizes detected pedestrian object $\mathbf{132}_2$ in object localization $\mathbf{136}_2(t_c)$ with (i) an associated object classification $\mathbf{138}_2(t_c)$ representing a CYCLIST label having 45% confidence value at classification confidence value 302, which does not satisfy the 50% threshold value at classification confidence threshold 302 and (ii) another object classification $\mathbf{138}_2(t_c)$ representing a CAR label having 55% confidence value at classification confidence value 302, which does satisfy the 50% threshold at classification confidence threshold 302. Accordingly, object classification $\mathbf{138}_2(t_c)$ having the CAR label together with its associated object localization $\mathbf{136}_2(t_c)$ that identified and localized detected cyclist object $\mathbf{132}_2$ are provided to component-based similarity measure generator 122 of FIG. 3D. Also, object classification $\mathbf{138}_1(t_c)$ having the CAR label is provided to object classification verifier of FIG. 3C.

Figure 3B:
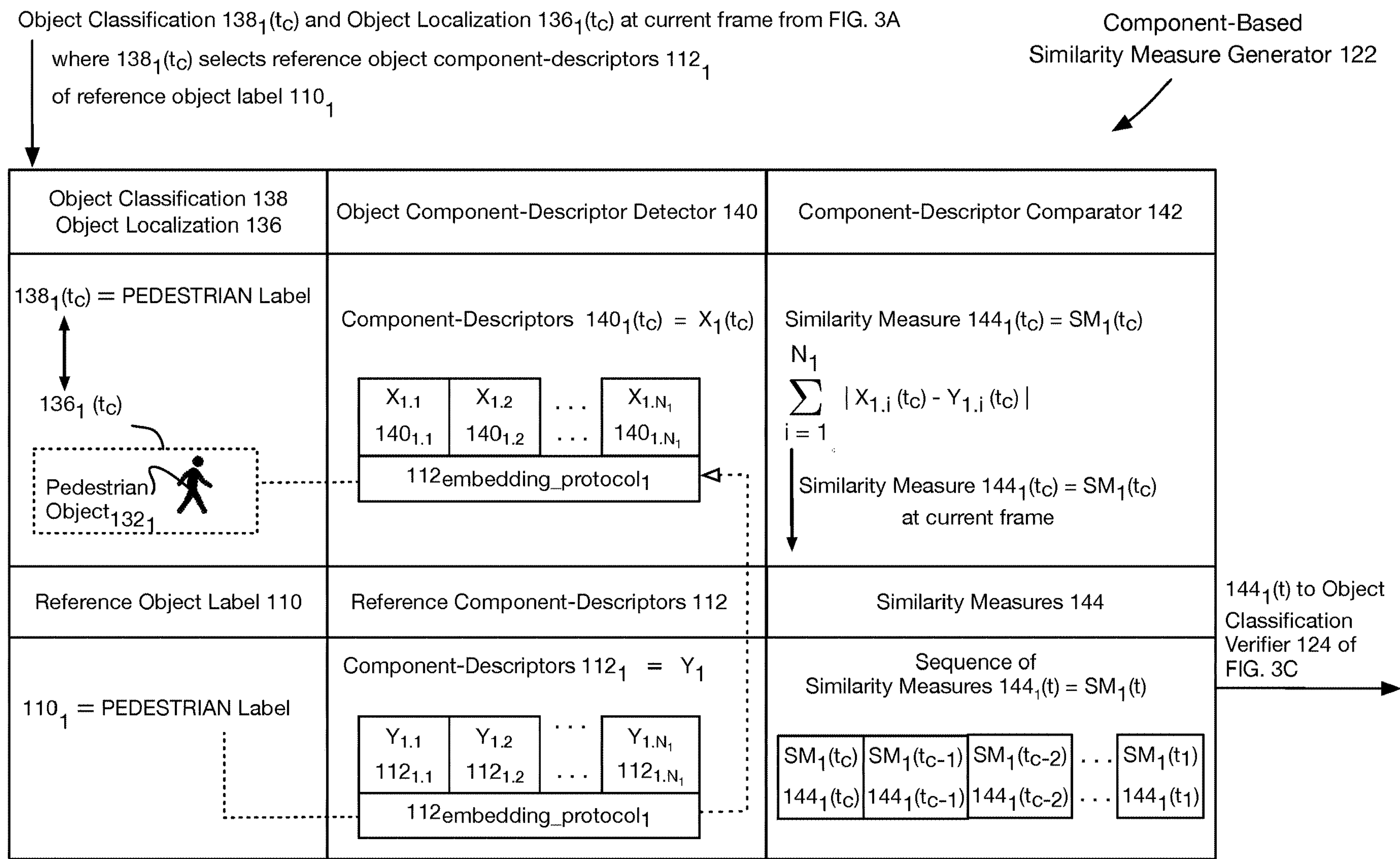

FIG. 3B illustrates an embodiment of component-based similarity measure generator 122 that receives object classification $\mathbf{138}_1(t_c)$ having the PEDESTRIAN label together with its associated object localization $\mathbf{136}_1(t_c)$ containing the identified and localized detected pedestrian object $\mathbf{132}_1$. In this embodiment, component-based similarity measure generator 122 includes an object-component descriptor detector 140 and a component-descriptor comparator 142.

Object-component descriptor detector 140 is responsive to object classification $\mathbf{138}_1(t_c)$ for selecting a reference embedding space mapping protocol $\mathbf{112}_{embedding\_protocol\_1}$, shown as $Y_{embedding\_protocol\_1}$, from memory 106 of FIG. 2 to generate a histogram of N object component-descriptors $X_{1.1}$ to $X_{1.N_1}$ from object localization $\mathbf{136}_1(t_c)$ at each frame, where the time $t_c$ corresponds to the current frame $$f_t^c$$

in the sequence of time intervals of $t_1$ to $t_F$.

Reference embedding space mapping protocol $\mathbf{112}_{embedding\_protocol\_1}$ is associated with the histogram of N reference component-descriptors $\mathbf{112}_{1.1}$ to $\mathbf{112}_{1.N_1}$, also shown as histogram of N object component-descriptors $Y_{1.1}$ to $Y_{1.N_1}$, for reference object class $\mathbf{110}_1$ that may represent an object class such as a pedestrian which is the same as the PEDESTRIAN label for object classification $\mathbf{138}_1(t_c)$.

Component-descriptor comparator 142 generates a similarity measure $\mathbf{144}_1(t_c)$, also shown as similarity measure $SM_1(t_c)$ from a cumulative difference function between object component-descriptors $X_{1.1}(t_c)$ to $X_{1.N_1}(t_c)$ and reference component-descriptors $Y_{1.1}(t_c)$ through $Y_{1.N_1}(t_c)$. The cumulative difference function for generating similarity measure $\mathbf{144}_1(t_c)$ is represented in the following equation:

$$\text{similarity measure } 144_1(t_c) = \sum_{i=1}^{N} |X_{1.i}(t_c) - Y_{1.i}(t_c)|$$

Figure 3C:
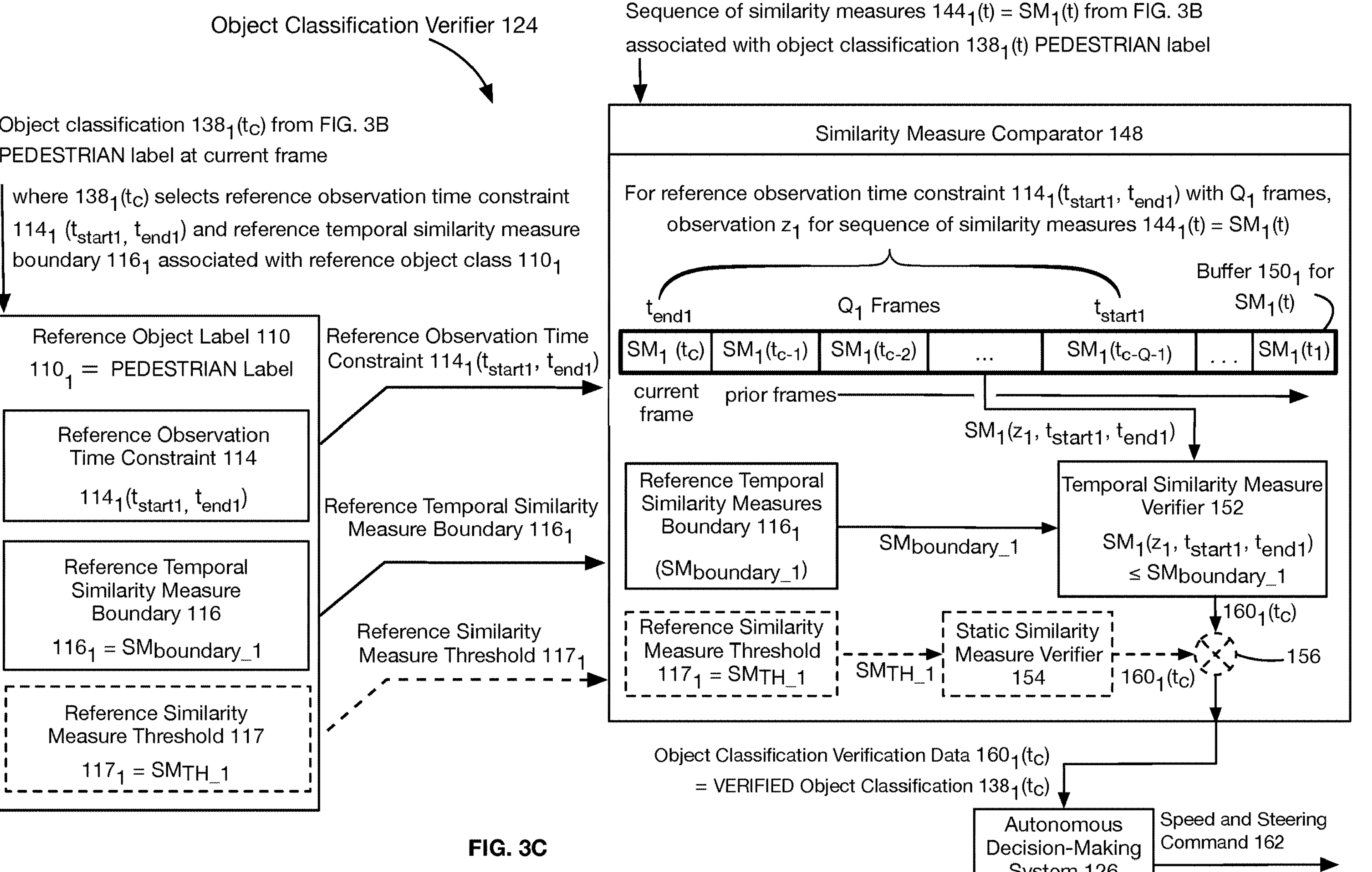

In one embodiment, component-based similarity measure generator 122 may include similarity measures 144 with a sequence of similarity measures $\mathbf{144}_1(t)$ from component-descriptor comparator 142 which are provided to object classification verifier 124 of FIG. 3C. The time to corresponds to the current frame $$f_t^c$$

sequence of time intervals of $t_1$ to $t_F$.

FIG. 3C illustrates an embodiment of object classification verifier 124 that is responsive to object classification $\mathbf{138}_1(t_c)$ from FIG. 3B for selecting reference observation time constraint $\mathbf{114}_1(t_{start\_1}, t_{end\_1})$ and reference temporal similarity measure boundary $\mathbf{116}_1$ associated with reference object class $\mathbf{110}_1$ having an object class that is the same as the PEDESTRIAN label associated with object classification $\mathbf{138}_1(t_c)$.

Object classification verifier 124 may include similarity measure comparator 148 having a buffer 1501 and a temporal similarity measure verifier 152. Similarity measure comparator 148 receives (i) object classification $\mathbf{138}_1(t_c)$ having the PEDESTRIAN label associated with detected pedestrian object $\mathbf{132}_1(t_c)$ at a current frame $$f_t^c,$$

and (ii) a sequence of similarity measures $\mathbf{144}_1(t)$ associated with a sequence of object classifications $\mathbf{138}_1(t)$, where the time t includes the current frame current frame $$f_t^c$$

and prior frames in the sequence of time intervals of $t_1$ to $t_F$.

Reference observation time constraint 114$_1$($t_{start\_1}$, $t_{end\_1}$) includes $Q_1$ frames within observation start time $t_{start1}$ to observation end time $t_{end1}$. The $Q_1$ frames define the current frame $$f_t^c$$

and the prior frames within the sequence of time intervals $t_1$ to $t_F$ for the sequence of similarity measures 144$_1$(t). Reference temporal similarity measure boundary 116$_1$ is illustrated as temporal similarity measure boundary $SM_{boundary\_1}$. The sequence of similarity measures 144$_1$(t)=$SM_1$(t) includes similarity measure $SM_1(t_c)$ at the current frame $$f_t^c$$

and similarity measures $SM_1(t_c-1)$, $SM_1(t_c-2)$, $SM_1(t_c-(Q-1))$, . . . $SM_1(t_1)$ at the prior frames within the sequence of time intervals $t_1$ to $t_F$.

Temporal similarity measure verifier 152 compares the sequence of similarity measures $SM_1$(t) generated within reference observation time constraint 114$_1$($t_{start\_1}$, $t_{end\_1}$) to a reference temporal similarity measure boundary $SM_{boundary\_1}$ for generating object classification verification data 160$_1$($t_c$) associated with object classification 138$_1$($t_c$) at the current frame $$f_t^c.$$

Object classification verification data 160$_1$($t_c$) may represent a validation measurement for object classification 138$_1$($t_c$) at the current frame $$f_t^c$$

from a combined similarity measure and probabilistic signal temporal logic (PSTL) constraint. The combined similarity measure and PSTL constraint is based on (i) the sequence of similarity measures $SM_1$(t) during the current frame $$f_t^c$$

and the prior frames within reference observation time constraint 114$_1$($t_{start\_1}$, $t_{end\_1}$); and (ii) the reference temporal similarity boundary $SM_{boundary\_1}$.

In one embodiment, the combined similarity measure $SM_1$(t) and probabilistic signal temporal logic (PSTL) is generated as follows:

$$\forall z,\ Pr(SM_1(z_1, t_{start1}, t_{end1}) \leq SM_{boundary\_1} \rightarrow \text{reference object class } 110_1)$$

where:

Pr (•) is a predicate;

$SM_1(z_1, t_{start1}, t_{end1})$ is the observation $z_1$ of the sequence of similarity measures $SM_1$ during a sequence of frames including the current frame $$f_t^c$$

and the prior frames within the reference observation time constraint 114$_1$ ($t_{start\_1}$, $t_{end\_1}$) associated with the reference object class 110$_1$;

$SM_{boundary\_1}$ represents performance characteristics from reference similarity measure sequences within reference observation time constraint 114$_1$ ($t_{start\_1}$, $t_{end\_1}$) for the selected reference object class 110$_1$, where the performance characteristics reflect verified object detection characteristics for instances of similarity measure sequencies within time constraint 114$_1$ ($t_{start\_1}$, $t_{end\_1}$) associated with reference object class 110$_1$; and the symbol "≤" refers to $SM_1$ ($z_1$, $t_{start\_1}$, $t_{end\_1}$) being within $SM_{boundary\_1}$ for determining object classification verification data 160$_1$($t_c$) with validity or error measure associated with object classification 138$_1$(t).

Object classification verification data 160$_1$($t_c$) represents a validation measurement that verifies the current object classification 138$_1$($t_c$) having a pedestrian label identified from the object localization 136$_1$($t_c$) associated with the detected pedestrian object 132$_1$. This verification reflects that sequence of similarity measures 144$_1$(t)=$SM_1$(t) during the observation time constraint 114$_1$ ($t_{start\_1}$, $t_{end\_1}$) are within the reference temporal similarity measures boundary 116$_1$. For example, the sequence of similarity measures 144$_1$(t)=$SM_1$(t) during the observation time constraint 114$_1$ ($t_{start\_1}$, $t_{end\_1}$) is modeled by various instances of a reference similarity measure sequence within temporal similarity measure boundary 116$_1$.

In one embodiment, reference object class 110$_1$ has an associated reference similarity measure threshold 117$_1$=$SM_{TH\_1}$ stored in memory 106 of FIG. 2A. Similarity measure comparator 148 may include a static similarity threshold verifier 154 and a verification data selector 156. Reference similarity measure threshold 117$_1$=$SM_{TH\_1}$ is selected in response to object classification object classification 138$_1$($t_c$) at the current frame. Static similarity threshold verifier 154 compares similarity measure $SM_1(t_c)$ to reference similarity measure threshold 117$_1$=$SM_{TH\_1}$ for generating object classification verification data 160$_1$($t_c$) associated with object classification 138$_1$($t_c$). Verification data selector 156 selects the output from static similarity threshold verifier 146 to utilize reference similarity measure threshold 117$_1$=$SM_{TH\_1}$ until the sequence of similarity measures $SM_1$(t) are at least equal to the number of $Q_1$ frames within the reference observation time constraint 114$_1$($t_{start1}$, $t_{end1}$). Verification data selector 156 selects the output from temporal similarity measure verifier 152 when the sequence of similarity measures $SM_1$(t) are at least equal to the number of $Q_1$ frames in the reference observation time constraint 114$_1$ ($t_{start1}$, $t_{end1}$).

Figure 3D:
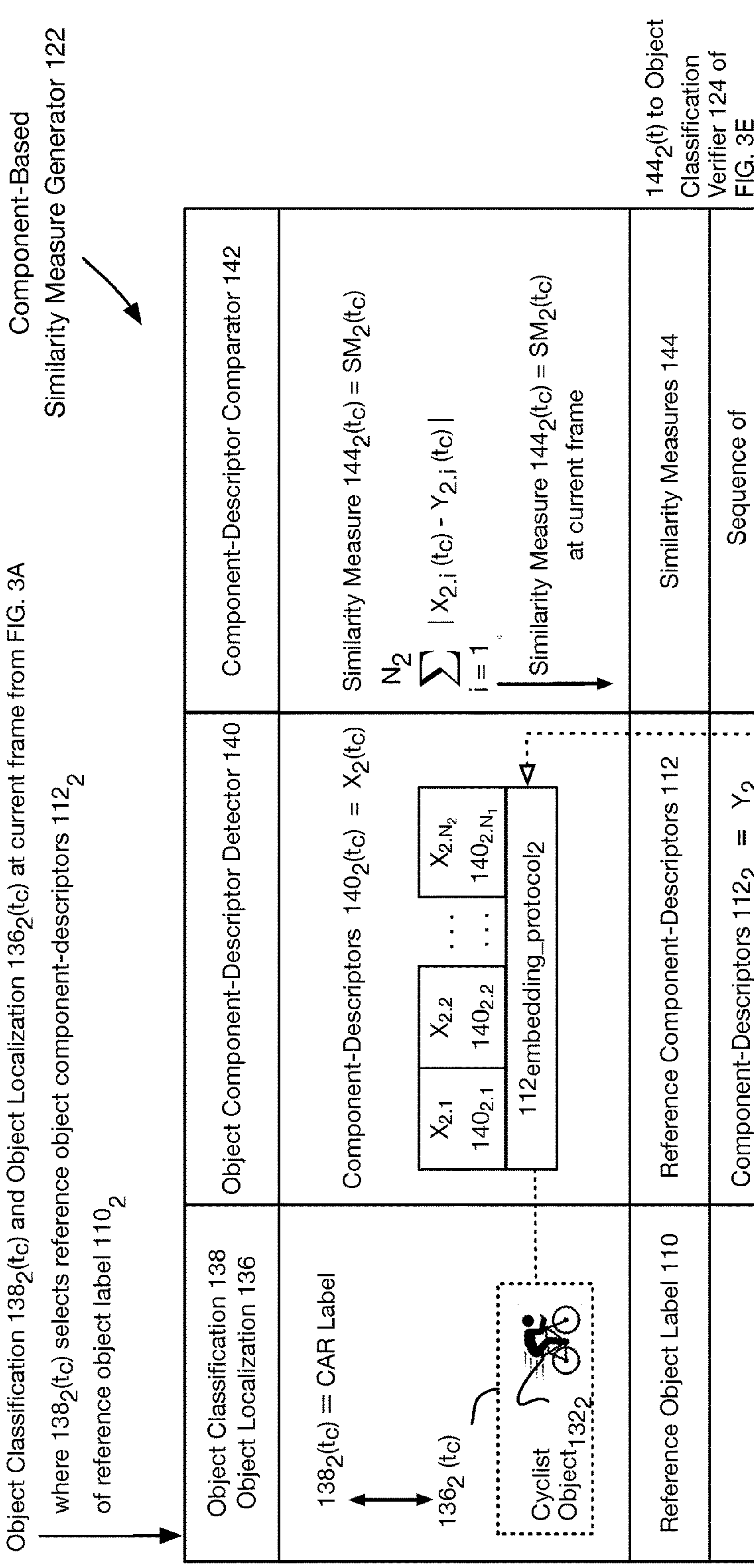

FIG. 3D illustrates an embodiment of component-based similarity measure generator 122 that receives object classification 138$_2$($t_c$) having the CAR label together with its associated object localization 136$_2$($t_c$) containing the identified and localized detected cyclist object 132$_2$. In this embodiment, component-based similarity measure generator 122 includes an object-component descriptor detector 140 and a component-descriptor comparator 142.

Object-component descriptor detector 140 is responsive to object classification $\mathbf{138}_2(t_c)$ for selecting a reference embedding space mapping protocol $\mathbf{112}_{embedding\_protocol\_2}$, shown as $Y_{embedding\_protocol\_2}$, from memory 106 of FIG. 2 to generate a histogram of N object component-descriptors $X_{2.1}$ to $X_{2.N_2}$ from object localization $\mathbf{136}_2(t_c)$ at each frame, where the time $t_c$ corresponds to the current frame $$f_t^c$$

in the sequence of time intervals of $t_1$ to tp.

Reference embedding space mapping protocol $\mathbf{112}_{embedding\_protocol\_2}$ is associated with the histogram of N reference component-descriptors $\mathbf{112}_{2.1}$ to $\mathbf{112}_{2.N_2}$, also shown as histogram of N object component-descriptors $Y_{2.1}$ to $Y_{2.N_2}$, for reference object class $\mathbf{110}_2$ that may represent an object class such as a CAR which is the same as the CAR label for object classification $\mathbf{138}_2(t_c)$.

Component-descriptor comparator 142 generates a similarity measure $\mathbf{144}_2(t_c)$, also shown as similarity measure $SM_2(t_c)$ from a cumulative difference function between object component-descriptors $X_{2.1}(t_c)$ to $X_{2.N_2}(t_c)$ and reference component-descriptors $Y_{2.1}(t_c)$ through $Y_{2.N_2}(t_c)$. The cumulative difference function for generating similarity measure $\mathbf{144}_2(t_c)$ is represented in the following equation:

$$\text{similarity measure } 144_2(t_c) = \sum_{i=1}^{N} |X_{2.i}(t_c) - Y_{2.i}(t_c)|$$

In one embodiment, component-based similarity measure generator 122 may include similarity measures 144 with a sequence of similarity measures $\mathbf{144}_2(t)$ from component-descriptor comparator 142 which are provided to object classification verifier 124 of FIG. 3C. The time to corresponds to the current frame $$f_t^c$$

in the sequence of time intervals of $t_1$ to $t_F$.

Figure 3E:
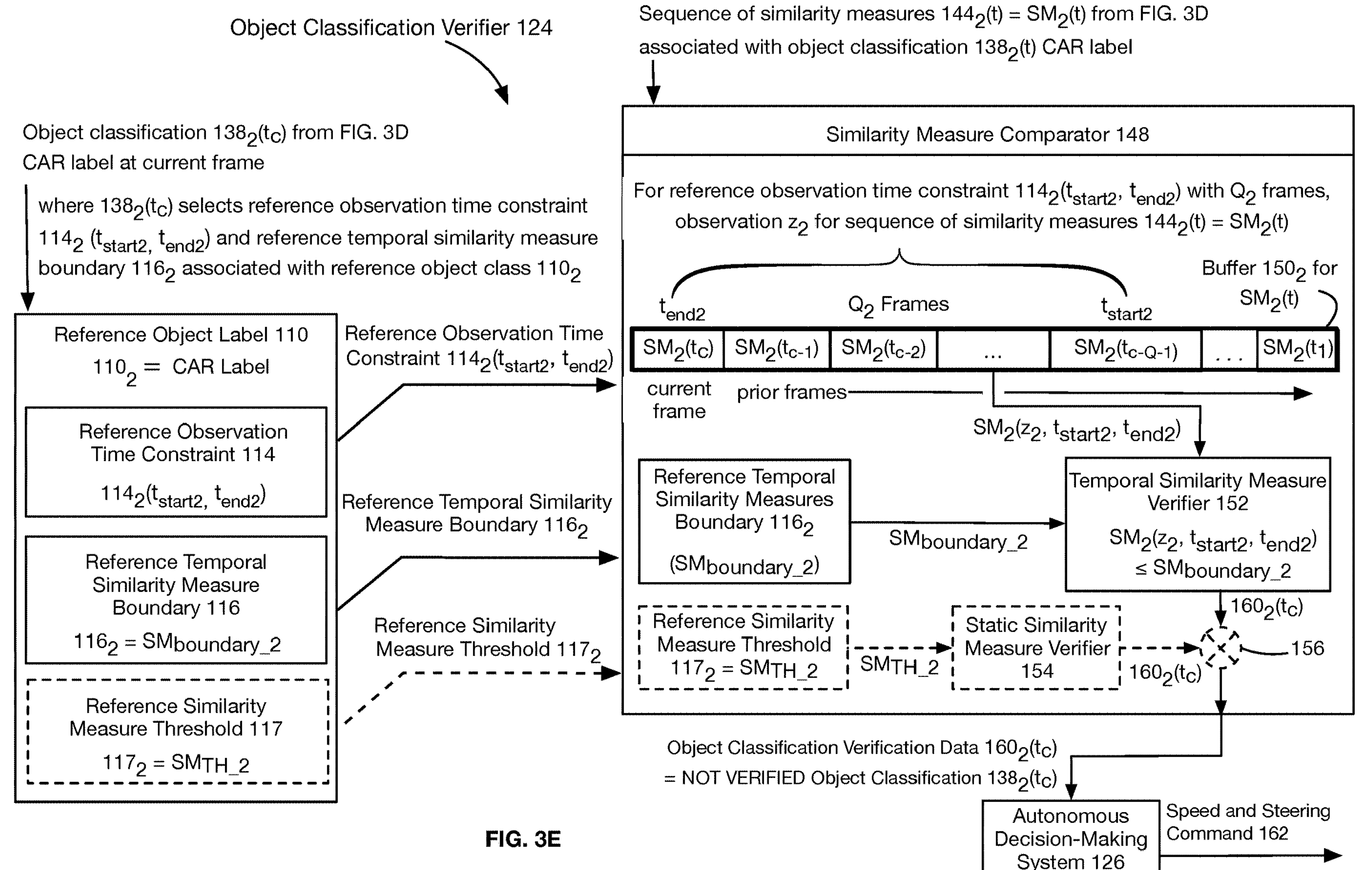

FIG. 3E illustrates an embodiment of object classification verifier 124 that is responsive to object classification $\mathbf{138}_2(t_c)$ from FIG. 3D for selecting reference observation time constraint $\mathbf{114}_2(t_{start\_2}, t_{end\_2})$ and reference temporal similarity measure boundary $\mathbf{116}_2$ associated with reference object class $\mathbf{110}_2$ having an object class that is the same as the CAR label associated with object classification $\mathbf{138}_2(t_c)$.

Object classification verifier 124 may include similarity measure comparator 148 having a buffer 1502 and a temporal similarity measure verifier 152. Similarity measure comparator 148 receives (i) object classification $\mathbf{138}_2(t_c)$ having the CAR label associated with detected pedestrian object $\mathbf{132}_2(t_c)$ at a current frame $$f_t^c,$$

and (ii) a sequence of similarity measures $\mathbf{144}_2(t)$ associated with a sequence of object classifications $\mathbf{138}_2(t)$, where the time t includes the current frame current frame $$f_t^c$$

and prior frames in the sequence of time intervals of $t_2$ to $t_F$.

Reference observation time constraint $\mathbf{114}_2(t_{start\_2}, t_{end\_2})$ includes $Q_2$ frames within observation start time $t_{start2}$ to observation end time $t_{end2}$. The $Q_2$ frames define the current frame $$f_t^c$$

and the prior frames within the sequence of time intervals $t_2$ to $t_F$ for the sequence of similarity measures $\mathbf{144}_2(t)$. Reference temporal similarity measure boundary $\mathbf{116}_2$ is illustrated as temporal similarity measure boundary $SM_{boundary\_2}$. The sequence of similarity measures $\mathbf{144}_2(t)=SM_2t)$ includes similarity measure $SM_2(t_c)$ at the current frame $$f_t^c$$

and similarity measures $SM_2(t_c-1)$, $SM_1(t_c-2)$, $SM_2(t_c\text{-}(Q-1))$, . . . $SM_2(t_1)$ at the prior frames within the sequence of time intervals $t_2$ to $t_F$.

Temporal similarity measure verifier 152 compares the sequence of similarity measures $SM_2(t)$ generated within reference observation time constraint $\mathbf{114}_2(t_{start\_2}, t_{end\_2})$ to a reference temporal similarity measure boundary $SM_{boundary\_2}$ for generating object classification verification data $\mathbf{160}_2(t_c)$ associated with object classification $\mathbf{138}_2(t_c)$ at the current frame $$f_t^c.$$

Object classification verification data $\mathbf{160}_2(t_c)$ may represent a validation measurement for object classification $\mathbf{138}_2(t_c)$ at the current frame $$f_t^c$$

from a combined similarity measure and probabilistic signal temporal logic (PSTL) constraint. The combined similarity measure and PSTL constraint is based on (i) the sequence of similarity measures $SM_2(t)$ during the current frame $$f_t^c$$

and the prior frames within reference observation time constraint $\mathbf{114}_2(t_{start\_2}, t_{end\_2})$; and (ii) the reference temporal similarity boundary $SM_{boundary\_2}$.

In one embodiment, the combined similarity measure $SM_2(t)$ and probabilistic signal temporal logic (PSTL) is generated as follows:

$$\forall z, Pr(SM_2(z_2, t_{start2}, t_{end2}) \leq SM_{boundary\_2} \rightarrow \text{reference object class } 110_2)$$

where:

Pr (•) is a predicate;

$SM_2(z_2, t_{start2}, t_{end2})$ is the observation $z_2$ of the sequence of similarity measures $SM_2$ during a sequence of frames including the current frame $$f_t^c$$

and the prior frames within the reference observation time constraint 114$_2$ $(t_{start\_2}, t_{end\_2})$ associated with the reference object class 110$_2$;

$SM_{boundary\_2}$ represents performance characteristics from reference similarity measure sequences within reference observation time constraint 114$_2$ $(t_{start\_2}, t_{end\_2})$ for the selected reference object class 110$_1$, where the performance characteristics reflect verified object detection characteristics for instances of similarity measure sequencies within time constraint 114$_1$ $(t_{start\_1}, t_{end\_1})$ associated with reference object class 110$_1$; and the symbol "≤" refers to $SM_1$ $(z_1, t_{start\_2}, t_{end\_2})$ being within $SM_{boundary\_2}$ for determining object classification verification data 160$_2(t_c)$ with validity or error measure associated with object classification 138$_2$(t).

Object classification verification data 160$_2(t_c)$ represents a validation measurement that does not verify the current object classification 138$_2(t_c)$ having a CAR label identified from the object localization 136$_2(t_c)$ associated with the detected pedestrian object 132$_2$. This non-verification reflects that sequence of similarity measures 144$_2$(t)=$SM_2$(t) during the observation time constraint 112$_2(t_{start\_2}, t_{end\_2})$ are not within the reference temporal similarity measures boundary 116$_2$. For example, the sequence of similarity measures 144$_2$(t)=$SM_2$(t) during the observation time constraint 114$_2$ $(t_{start\_2}, t_{end\_2})$ do not satisfy model characteristics of any instance of a reference similarity measure sequence within temporal similarity measure boundary 116$_2$.

In another embodiment, reference object class 110$_2$ has an associated reference similarity measure threshold 117$_2$=$SM_{TH\_2}$ stored in memory 106 of FIG. 2A. Similarity measure comparator 148 may include a static similarity threshold verifier 154 and a verification data selector 156. Reference similarity measure threshold 117$_2$=$SM_{TH\_2}$ is selected in response to object classification object classification 138$_2(t_c)$ at the current frame. Static similarity threshold verifier 154 compares similarity measure $SM_2(t_c)$ to reference similarity measure threshold 117$_2$=$SM_{TH\_2}$ for generating object classification verification data 160$_2(t_c)$ associated with object classification 138$_2(t_c)$. Verification data selector 156 selects the output from static similarity threshold verifier 154 to utilize reference similarity measure threshold 117$_2$=$SM_{TH\_2}$ until the sequence of similarity measures $SM_2$(t) are at least equal to the number of $Q_2$ frames within the reference observation time constraint 114$_2(t_{start2}, t_{end2})$. Verification data selector 156 selects the output from temporal similarity measure verifier 152 when the sequence of similarity measures $SM_2$(t) are at least equal to the number of $Q_2$ frames in the reference observation time constraint 114$_2(t_{start2}, t_{end2})$.

Figure 4:
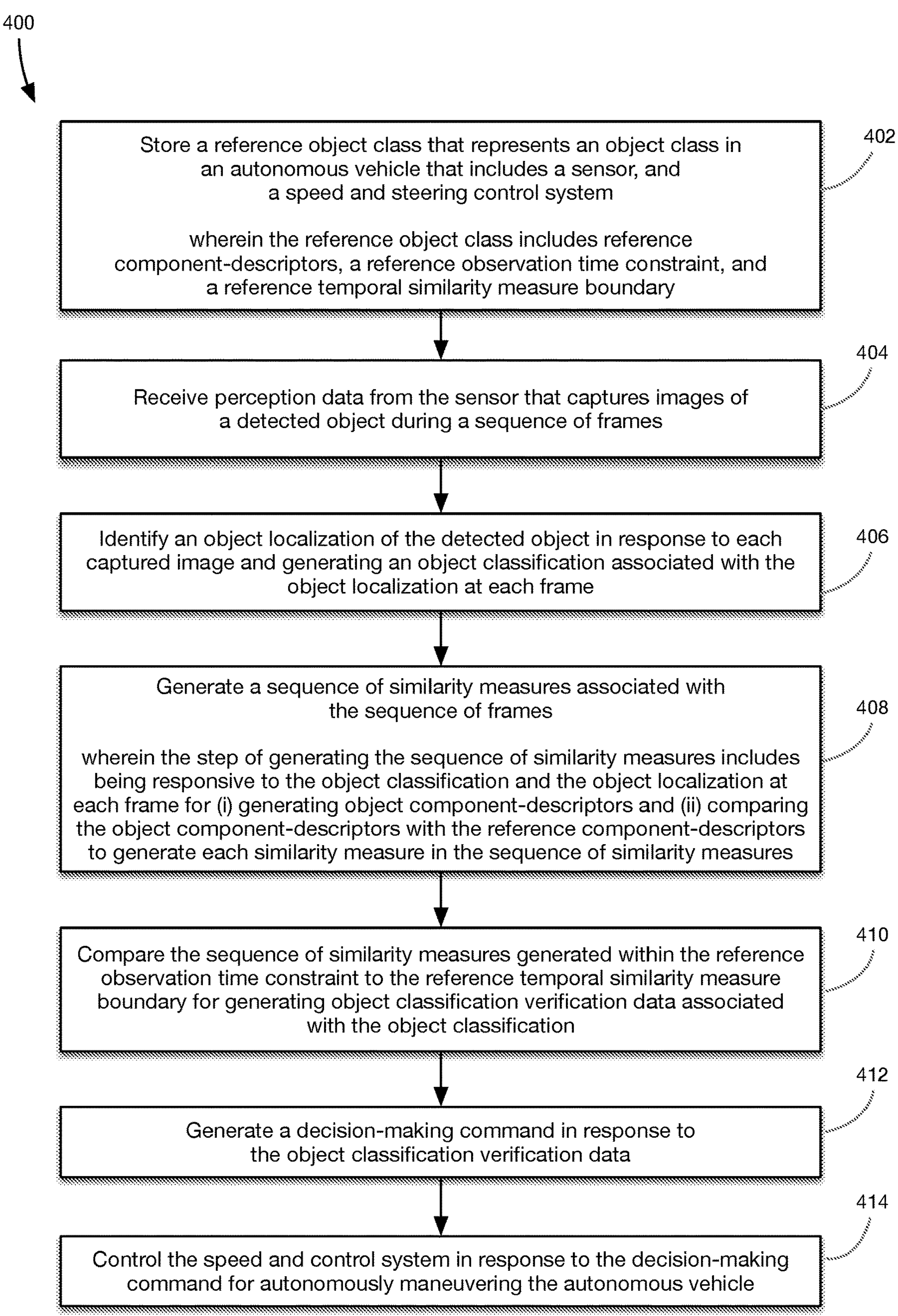
FIG. 4 is a flow chart illustrating an example embodiment of a process for verifying object classification in an autonomous vehicle.

FIG. 4 is a method 400 for verifying object classification in an autonomous vehicle including a sensor and a speed and steering control system. Step 402 stores a reference object class that represents an object class in an autonomous vehicle that includes a sensor, and a speed and steering control system. The reference object class includes reference component-descriptors, a reference observation time constraint, and a reference temporal similarity measure boundary. Step 404 receives perception data from the sensor that captures images of a detected object during a sequence of frames. Step 406 identifies an object localization of the detected object in response to each captured image and generating an object classification associated with the object localization at each frame.

Step 408 generates a sequence of similarity measures associated with the sequence of frames. The step of generating the sequence of similarity measures includes being responsive to the object classification and the object localization at each frame for (i) generating object component-descriptors and (ii) comparing the object component-descriptors with the reference component-descriptors to generate each similarity measure in the sequence of similarity measures. Step 410 compares the sequence of similarity measures generated within the reference observation time constraint to the reference temporal similarity measure boundary for generating object classification verification data associated with the object classification. Step 412 generates a decision-making command in response to the object classification verification data. Step 414 controls the speed and control system in response to the decision-making command for autonomously maneuvering the autonomous vehicle.

Figure 5:
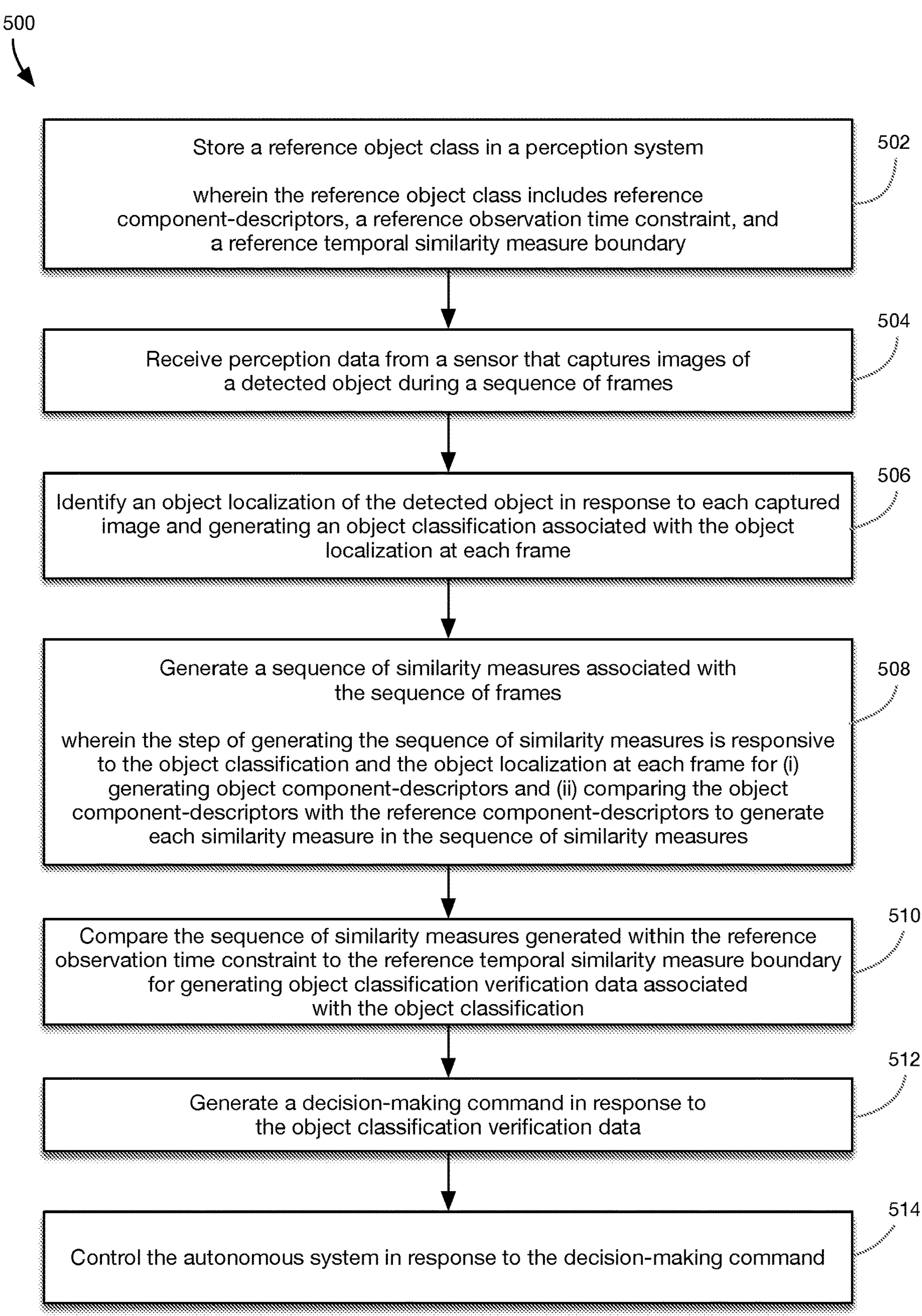
FIG. 5 is a flow chart illustrating an example embodiment of a process for verifying object classification in a perception system.

FIG. 5 is a method 500 for verifying object classification in a perception system. Step 502 stores a reference object class in a perception system of an autonomous system that includes a sensor. The reference object class includes reference component-descriptors, a reference observation time constraint, and a reference temporal similarity measure boundary. Step 504 receives perception data from the sensor that captures images of a detected object during a sequence of frames. Step 506 identifies an object localization of the detected object in response to each captured image and generating an object classification associated with the object localization at each frame.

Step 508 generates a sequence of similarity measures associated with the sequence of frames. The step of generating the sequence of similarity measures is responsive to the object classification and the object localization at each frame for (i) generating object component-descriptors and (ii) comparing the object component-descriptors with the reference component-descriptors to generate each similarity measure in the sequence of similarity measures. Step 510 compares the sequence of similarity measures generated within the reference observation time constraint to the reference temporal similarity measure boundary for generating object classification verification data associated with the object classification. Step 512 generates a decision-making command in response to the object classification verification data. Step 514 controls the autonomous system in response to the decision-making command.

The perception system may be embedded in an autonomous vehicle that includes a (i) sensor and (ii) a speed and steering control system, and the step of controlling the perception system includes controlling the speed and control system in response to the decision-making command for autonomously maneuvering the autonomous vehicle. Alternatively, the perception system may be embedded in an autonomous aviation security system that includes a surveillance system, and the step of controlling the perception system includes controlling the surveillance system in response to the decision-making command for autonomously controlling the aviation security system.

Referring to FIGS. 4 and 5, the reference component-descriptors (i) define components of an object classification label associated with the generated object classification and (ii) include a reference embedding space mapping protocol for generating object component-descriptors to identify component characteristics from the object localization associated with the generated object classification.

The reference component-descriptors may include (i) a histogram of reference component-descriptors that represent reference component cluster centroids in an embedded space associated with the reference object class and (ii) an embedding space mapping protocol associated with generating the histogram of reference component-descriptors; and the object component-descriptors may include a histogram of object component-descriptors that represent object component locations in the embedded space associated with the reference object class. In one embodiment, the histogram of reference component-descriptors may include a histogram of N reference component-descriptors $Y_1$ through $Y_N$ that represent N reference component cluster centroids in the embedded space associated with the reference object class; the histogram of object component-descriptors may include a histogram of N object component-descriptors $X_1$ through $X_N$ that represent N object component locations in the embedded space associated with the reference object class; and the embedding space mapping protocol generates the histogram of N object component-descriptors $X_1$ through $X_N$ from the object localization at each frame.

The memory may include a set of reference object classes, each reference object class in the set of reference object classes having an associated set of reference component-descriptors, a reference observation time constraint, and a reference temporal similarity measure boundary. A reference object class is selected from the set of reference object classes in response to an object classification label associated with the generated object classification.

The method steps may include generating a classification confidence value associated with the object classification; and generating the sequence of similarity measures when the classification confidence value satisfies a classification confidence threshold. The reference embedding space mapping protocol may be selected in response to the object classification to generate the histogram of object component-descriptors from the object localization at each frame.

The similarity measure may be generated as a cumulative difference between the object component-descriptors and the reference component-descriptors. The similarity measure may be generated as a cumulative difference function between the object component-descriptors $X_1$ through $X_N$ and the reference component-descriptors $Y_1$ through $Y_N$, and the cumulative difference function is:

$$\text{similarity measure} = \sum_{i=1}^{N} |X_i - Y_i|$$

In one embodiment, the sequence of frames has a current frame and prior frames and the reference observation time constraint an observation start time $t_{start}$ and an observation end time $t_{end}$. The object classification verification data represents a validation measurement for the object classification at the current frame, the validation measurement is a comparison of (i) the sequence of similarity measures associated with the detected object at the current frame and the prior frames within the observation start time $t_{start}$ and the observation end time $t_{end}$ and (ii) the reference temporal similarity measure boundary associated with the reference object class. The validation measurement for the object classification is a verified classification when the sequence of similarity measures associated with the detected object at the current frame and the prior frames during the reference observation time constraint is within the reference temporal similarity measure boundary associated with the reference object class.

For example, the validation measurement for the object classification at the current frame is determined from combined similarity measures and probabilistic signal temporal logic constraints based on (i) the sequence of similarity measures during the current frame and the prior frames within reference observation time constraint; and (ii) the reference temporal similarity boundary associated with the reference object class. The validation measurement represents a verified classification at the current frame when the sequence of similarity measures associated with the detected object during the reference observation time constraint is within the reference temporal similarity measure boundary. The validation measurement represents a misclassification at the current frame when the sequence of similarity measures associated with the detected object during the reference observation time constraint are not within the reference temporal similarity measure boundary. The combined similarity measures with probabilistic signal temporal logic constraints may be generated as follows:

$$\forall z,\ Pr\big(SM(z,\ t_{start}:\ t_{end}) \leq \text{SM\_boundary} \rightarrow \text{the reference object class}\big)$$

where:

- Pr (•) is a predicate;
- SM(z, $t_{start}$, $t_{end}$) is the observation z of the sequence of similarity measures SM during a sequence of frames including the current frame and the prior frames within the reference observation time constraint associated with the reference object class 110;
- SM_boundary represents performance characteristics from reference similarity measure sequences within the reference observation time constraint for the selected reference object class where the performance characteristics reflect verified object detection characteristics for instances of similarity measure sequencies within time constraint associated with reference object class; and
- the symbol "≤" refers to SM (z, $t_{start}$, $t_{end}$) being within SM_boundary for determining the validation measurement associated with object classification at the current frame.

Figure 6A:
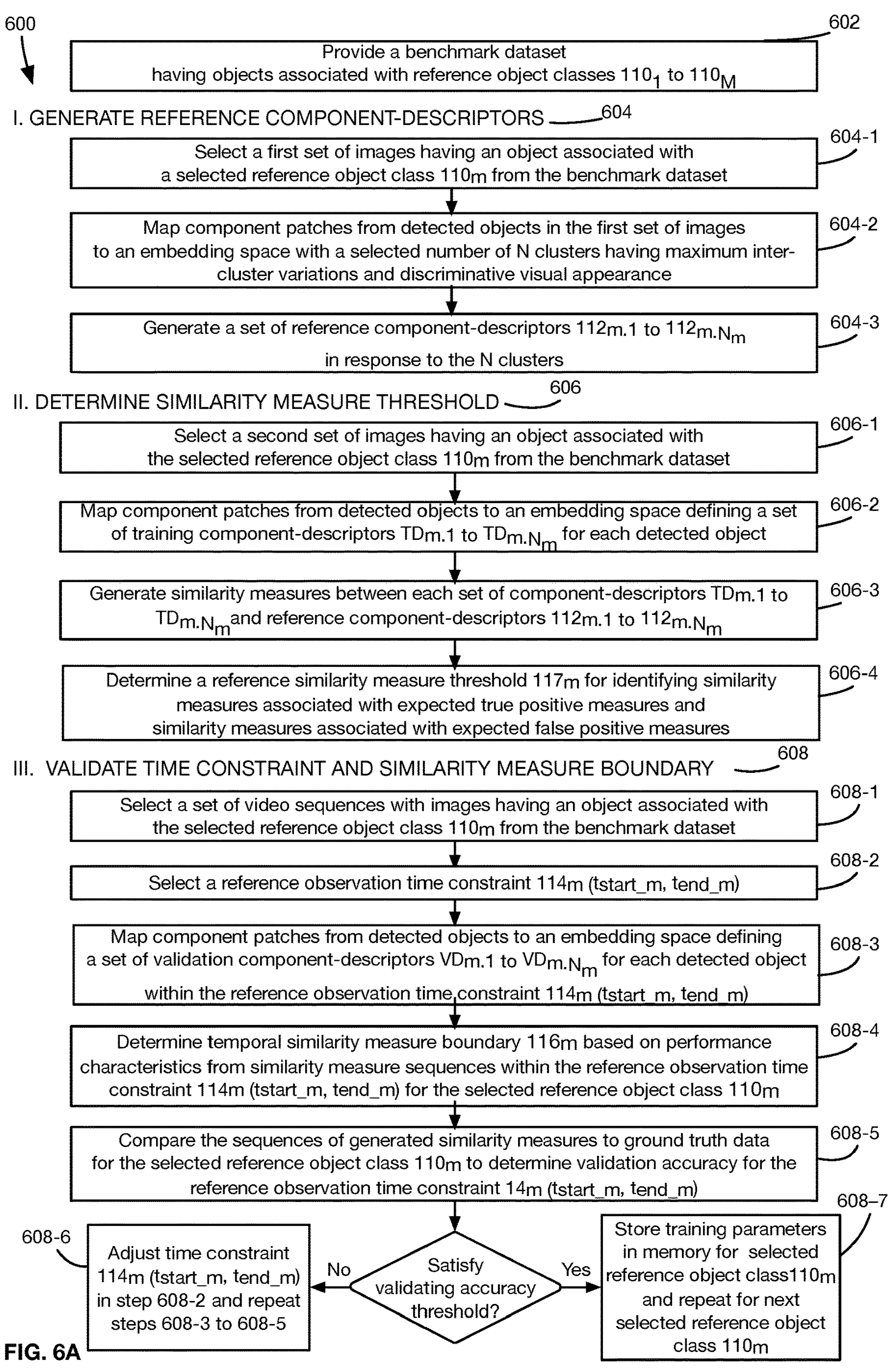

FIG. 6A illustrates an example method 600 for training component-based descriptor and temporal similarity measure parameters for post-processing an object detector output to verify object classifications that reflect true detections or identify object misclassification errors that reflect false detections. For example, the trained component-based descriptors and similarity measures may be configured in (i) autonomous surface vehicles for safe steering and speed control decision making, (ii) autonomous aerial vehicles for above-wing and below-wing autonomy (such as above-wing autonomy in accurate passenger and crew detection for safety monitoring and below-wing autonomy in accurate vehicle detections and safe maneuvering in airport taxiways), and (iii) aviation security systems for accurate airport terminal surveillance.

In one embodiment, method 600 illustrates an example of developing the set of reference object classes $\mathbf{110}_1$ to $\mathbf{110}_M$ for post-processing an object detector output in autonomous systems such autonomous surface vehicles, autonomous aerial vehicles, and aviation security systems. Each reference object class $\mathbf{110}_m$ in the set of reference object classes $\mathbf{110}_1$ to $\mathbf{110}_M$ may have trained parameters that include (i) a set of reference component-descriptors $\mathbf{112}_{m.1}$ to $\mathbf{112}_{m.Nm}$, (ii) a reference observation time constraint $\mathbf{114}_m$ ($t_{start\_m}$, $t_{end\_m}$), and (iii) reference temporal similarity measure boundary $\mathbf{116}_m$ associated with reference object class $\mathbf{110}_m$. For example, the set of reference object classes $\mathbf{110}_1$ to $\mathbf{110}_M$ together with their respective trained parameters may be stored in memory 106 of FIG. 2 for post-processing the object detector output in autonomous vehicle 100 of FIG. 1.

Method 600 includes step 602 that provides a benchmark dataset having objects associated with reference object classes $\mathbf{110}_1$ to $\mathbf{110}_M$, step 604 that generates reference component-descriptors $\mathbf{112}_{m.1}$ to $\mathbf{112}_{m.Nm}$, step 606 that determines a similarity measure threshold $\mathbf{117}_m$=$SM_{TH\_m}$, and step 608 that validates a reference observation time constraint $\mathbf{114}_m$ ($t_{start\_m}$, $t_{end\_m}$) for a reference similarity measure boundary $\mathbf{116}_m$:

I. Generating Reference Component-Descriptors. Step 604 performs the following steps to generate reference component-descriptors $\mathbf{112}_{m.1}$ to $\mathbf{112}_{m.Nm}$: step 604-1 selects a first set of images having an object associated with a selected reference object class $\mathbf{110}_m$ which represents an object class such as a pedestrian or cyclist object class from a benchmark dataset; step 604-2 maps component patches from detected objects in the first set of images to an embedding space with a selected number of N clusters having maximum inter-cluster variations and discriminative visual appearance; and step 604-3 generates a set of reference component-descriptors $\mathbf{112}_{m.1}$ to $\mathbf{112}_{m.Nm}$, in response to the N clusters. The selected reference object class $\mathbf{110}_m$ refers to the $m^{th}$ reference object class $\mathbf{110}_m$ in the set of reference object classes $\mathbf{110}_1$ to $\mathbf{110}_M$, for m=1 to M. The $m^{th}$ set of reference component-descriptors $\mathbf{112}_{m.1}$ to $\mathbf{112}_{m.Nm}$ include Nm reference component-descriptors, where the number of Nm reference component-descriptors may depend on characteristics of an object class such as a pedestrian or cyclist associated with reference object class $\mathbf{110}_m$.

II. Determine Similarity Measure Threshold. Step 606 performs the following steps to determine a similarity measure threshold $\mathbf{117}_m$=$SM_{TH\_m}$: Step 606-1 selects a second set of images having an object associated with the selected reference object class $\mathbf{110}_m$ from the benchmark dataset. Step 606-2 maps component patches from detected objects to an embedding space defining a set of training component-descriptors $TD_{m.1}$ to $TD_{m.Nm}$ for each detected object. Step 606-3 generates similarity measures between each set of training component-descriptors $TD_{m.1}$ to $TD_{m.Nm}$ and the reference set of component-descriptors $\mathbf{112}_{m.1}$ to $\mathbf{112}_{m.Nm}$. Step 606-4 determines a reference similarity measure threshold $\mathbf{117}_m$=$SM_{TH\_m}$ for identifying similarity measures associated with expected true positive measures and similarity measures associated with expected false positive measures.

III. Validate Observation Time Constraint and Similarity Measure Boundary. Step 608 includes the following steps to determine validation accuracy for reference observation time constraint $\mathbf{114}_m$ ($t_{start\_m}$, $t_{end\_m}$): Step 608-1 selects a set of video sequences with images having an object associated with the selected reference object class $\mathbf{110}_m$ from the benchmark dataset. Step 608-2 selects a reference observation time constraint $\mathbf{114}_m$ ($t_{start\_m}$, $t_{end\_m}$). Step 608-3 maps component patches from detected objects to an embedding space that defines a set of validation component-descriptors $VD_{m.1}$ to $VD_{m.Nm}$ for each detected object during the reference observation time constraint $\mathbf{114}_m$ ($t_{start\_m}$, $t_{end\_m}$). Step 608-4 determines reference temporal similarity measure boundary $\mathbf{116}_m$ defining sequences of generated similarity measures representing expected true positive detections and expected false positive detections during the reference observation time constraint $\mathbf{114}_m$ ($t_{start\_m}$, $t_{end\_m}$).

Step 608-5 compares the sequences of generated similarity measures to ground truth data for the selected reference object class $\mathbf{110}_m$ to determine validation accuracy for the reference observation time constraint $\mathbf{114}_m$ ($t_{start\_m}$, $t_{end\_m}$). If the validation accuracy of reference observation time constraint $\mathbf{114}_m$ ($t_{start\_m}$, $t_{end\_m}$) does not satisfy a validating accuracy threshold target, then perform step 608-6 to adjust reference observation time constraint $\mathbf{114}_m$ ($t_{start\_m}$, $t_{end\_m}$) in step 608-2 and repeat steps 608-3 to 608-5. If the validation accuracy for reference observation time constraint $\mathbf{114}_m$ ($t_{start\_m}$, $t_{end\_m}$) satisfies the validating accuracy threshold target, then perform step 608-7 to store the training parameters developed in steps 604, 606, and 608, in memory such as memory 106 of FIG. 2 for selected reference object class $\mathbf{110}_m$, and then repeat method 600 for another reference object class $\mathbf{110}_m$ such as a cyclist object class.

Figure 6B:
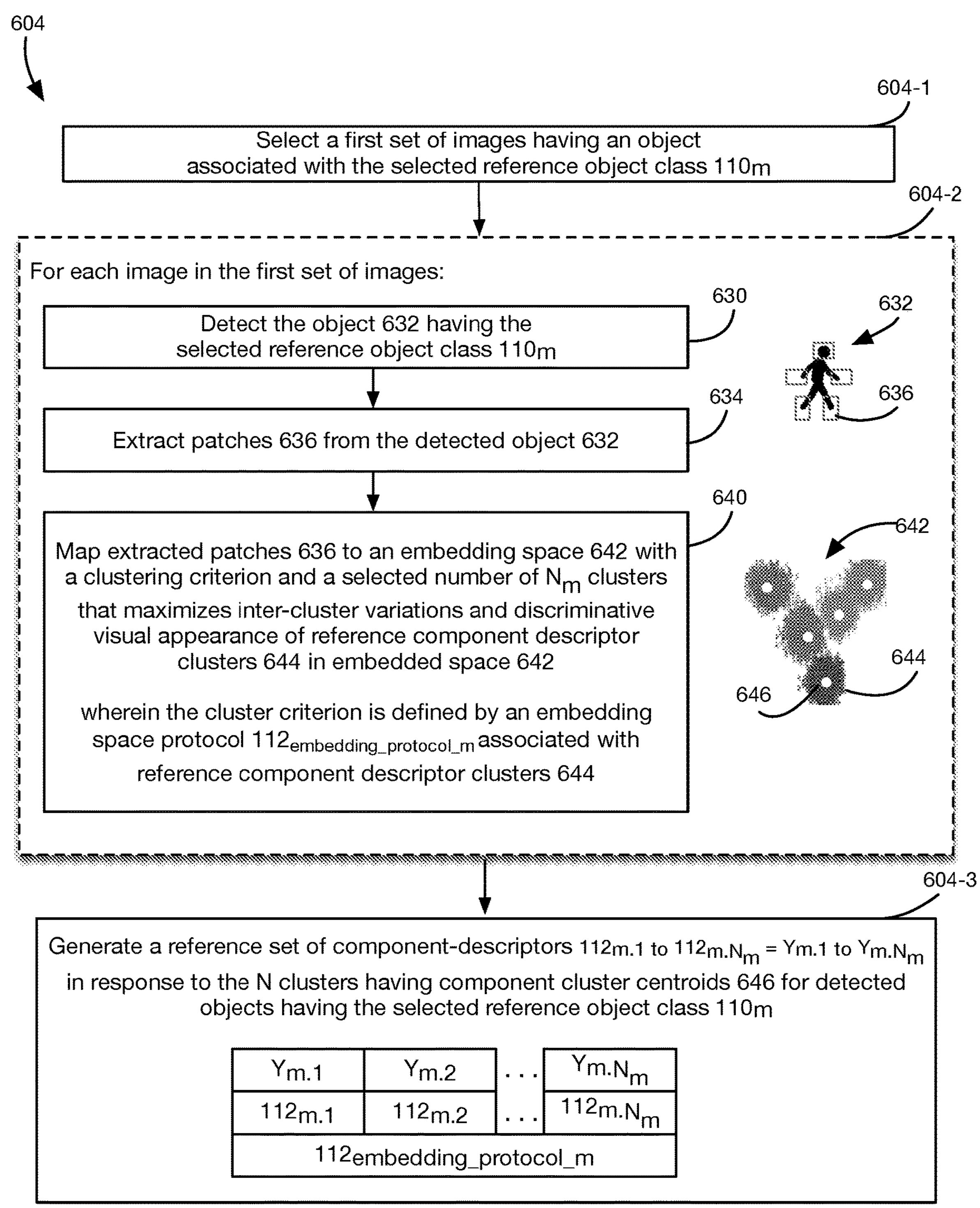

FIG. 6B illustrates an embodiment of step 604 that includes the following steps for generating the set of reference component-descriptors $\mathbf{112}_{m.1}$ to $\mathbf{112}_{m.Nm}$ in FIG. 6A.

Step 604-1 selects a first set of images having an object associated with the selected reference object class $\mathbf{110}_m$ from a benchmark dataset.

For each image in the set of first images, step 604-2 maps component patches from detected objects to an embedding space having N clusters by performing the following steps: step 630 detects the object having the selected reference object class $\mathbf{110}_m$; step 634 extracts patches from the detected object; and step 640 maps extracted patches to an embedding space 642 with a clustering criterion and a selected number of Nm clusters that maximizes inter-cluster variations and discriminative visual appearance of reference component descriptor clusters in embedded space 642, the cluster criterion is defined by an embedding space protocol $\mathbf{112}_{embedding\_protocol\_m}$ associated with reference component descriptor clusters 644.

Step 604-3 generates a set of reference component-descriptors $\mathbf{112}_{m.1}$ to $\mathbf{112}_{m.Nm}$=$Y_{m.1}$ to $Y_{m.Nm}$ in response to the N clusters having component cluster centroids for detected objects having the selected reference object class $\mathbf{110}_m$. An example of embedded clustering to create a histogram of component attributes is disclosed in commonly assigned issued U.S. Pat. No. 11,023,798 entitled Machine-Vision Method to Classify Input Data Based on Object Components, issued on Jun. 1, 2021, which is hereby incorporated by reference in its entirety.

Figure 6C:
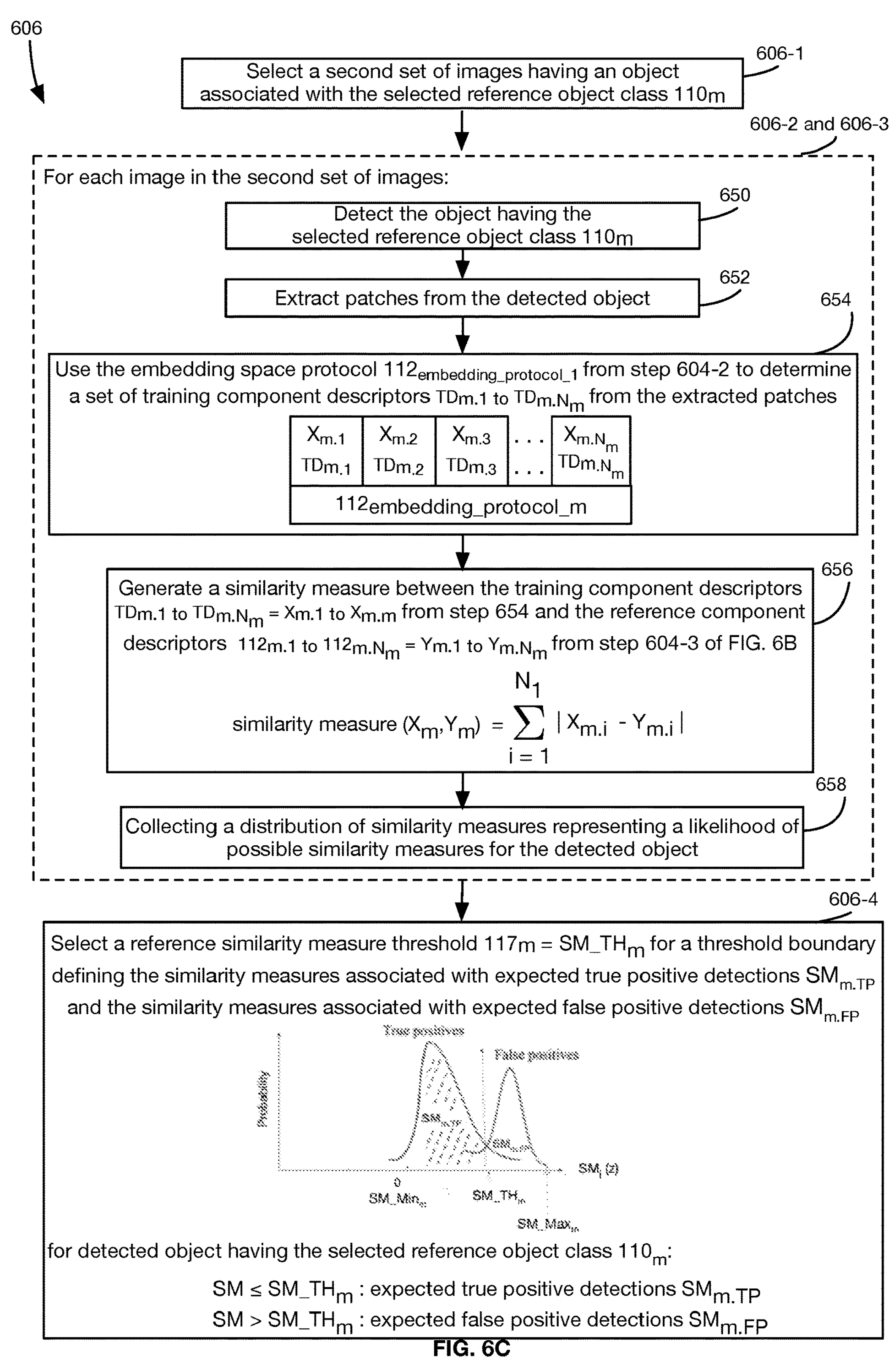

FIG. 6C illustrates an embodiment of step 606 that includes the following steps for determining the reference similarity measure threshold $\mathbf{117}_m$=$SM_{TH}$ in FIG. 6A. Step 606-1 selects a second set of images having an object associated with the selected reference object class $\mathbf{110}_m$.

For each image in the second set of images, steps 606-2 and 606-3 compiles a distribution of similarity measures generated between training component descriptors and the reference component descriptors by performing the following steps: step 650 detects the object having the selected reference object class $\mathbf{110}_m$; step 652 extracts patches from the detected object; step 654 utilizes the embedding space mapping protocol $\mathbf{112}_{embedding\_protocol\_m}$ to determine a set of training component descriptors $TD_{m.1}$ to $TD_{m.Nm}$ (also shown as $X_{m.1}$ to $X_{m.Nm}$) from the extracted patches; step 656 generates a similarity measure between the training component descriptors $TD_{m.1}$ to $TD_{m.Nm}=X_{m.1}$ to $X_{m.Nm}$ and the reference component descriptors $\mathbf{112}_{m.1}$ to $\mathbf{112}_{m.Nm}=Y_{m.1}$ to $Y_{m.Nm}$, and step 658 compiles a distribution of similarity measures representing a likelihood of possible similarity measures for the detected object.

Step 606-4 selects the reference similarity measure threshold $\mathbf{117}_m=SM_{TH}$ for defining the similarity measures associated with expected true positive detections and the similarity measures associated with expected false positive detections.

Figure 6D:
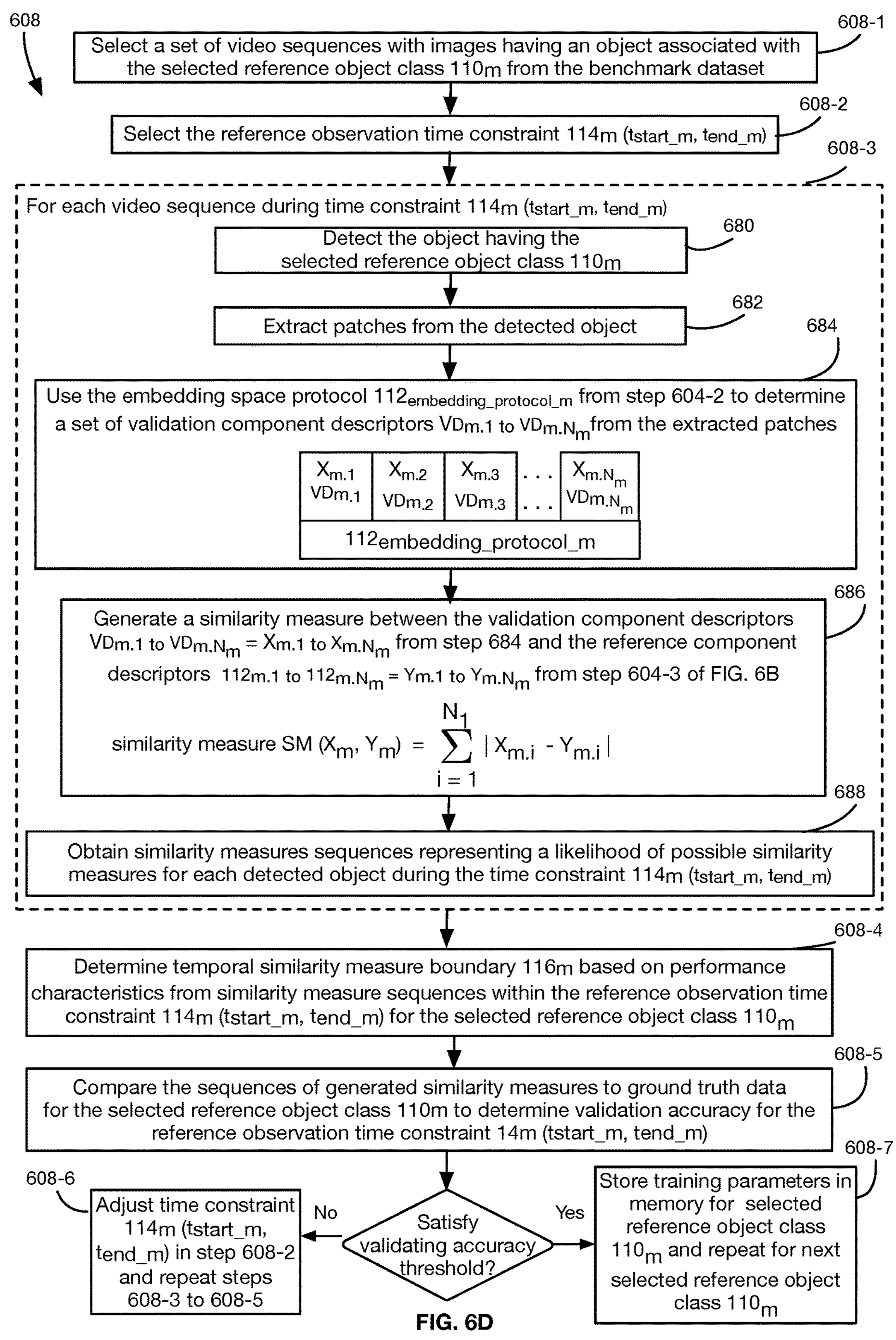

FIG. 6D illustrates an embodiment of step 608 that includes the following steps for determining the validation accuracy of reference observation timing constraint $\mathbf{114}_m$ ($t_{start\_m}$, $t_{end\_m}$) in FIG. 6A. Step 608-1 selects a set of video sequences with images having an object associated with the selected reference object class $\mathbf{110}_m$ from the benchmark dataset. Step 608-2 selects the reference observation timing constraint $\mathbf{114}_m$ ($t_{start\_m}$, $t_{end\_m}$).

For each video sequence during the reference observation timing constraint $\mathbf{114}_m$ ($t_{start\_m}$, $t_{end\_m}$), step 608-3 compiles a distribution of similarity measures generated between validation component-descriptors and the reference component-descriptors by performing the following steps: step 680 detects the object having the selected reference object class $\mathbf{110}_m$; step 682 extracts patches from the detected object; step 684 utilizes the embedding mapping space protocol $\mathbf{112}_{embedding\_protocol\_m}$ to determine a set of validation component descriptors $VD_{m.1}$ to $VD_{m.Nm}=X_{m.1}$ to $X_{m.Nm}$ from the extracted patches, and step 686 generates a similarity measure between the validation component descriptors $VD_{m.1}$ to $VD_{m.Nm}=X_{m.1}$ to $X_{m.Nm}$ and the reference component descriptors $\mathbf{112}_{m.1}$ to $\mathbf{112}_{m.Nm}=Y_{m.1}$ to $Y_{m.Nm}$; and step 688 compiles a distribution of similarity measures representing a likelihood of possible similarity measures for each detected object during the reference observation timing constraint $\mathbf{114}_m$ ($t_{start\_m}$, $t_{end\_m}$).

Step 608-4 determines temporal similarity measure boundary $\mathbf{116}_m$ based on performance characteristics from similarity measures sequences within the time constraint $\mathbf{114}_m$ ($t_{startm}$, $t_{endm}$) for the selected reference object class $\mathbf{110}_m$. For example, by using probabilistic signal temporal logic (PSTL) formulation, the efficacy of temporal similarity measures may be examined and captured for predicting correct object classification.

Step 608-5 compares the sequences of generated similarity measures for the observation $z_m$ of the detected object to ground truth data for the selected reference object class $\mathbf{110}_m$ to determine validation accuracy of the reference observation timing constraint $\mathbf{114}_m$ ($t_{start\_m}$, $t_{end\_m}$). If the validation accuracy for reference observation time constraint $\mathbf{114}_m$ ($t_{start\_m}$, $t_{end\_m}$) satisfies the validating accuracy threshold target, then perform step 608-7 to store the training parameters developed in steps 604, 606, and 608, in memory such as memory 106 of FIG. 2 for the selected reference object class $\mathbf{110}_m$, and then repeat method 600 for another reference object class $\mathbf{110}_m$ such as a cyclist object class.

FIG. 6E is a table illustrating K instances of trained or learned reference similarity measure sequences $SM_{m.k.q}$ within reference temporal similarity measure boundary $\mathbf{116}_m$ from step 608-4. Reference temporal similarity measure boundary $\mathbf{116}_m$ represents performance characteristics from reference similarity measure sequences $SM_{m.k.1}$ to $SM_{m.k.Q}$, where $Q_m$ is the total number of frames within reference observation time constraint $\mathbf{114}_m$ ($t_{start\_m}$, $t_{end\_m}$) associated with reference object class $\mathbf{110}_m$. The reference similarity measure sequences represent expected true positive detections and expected false positive dete-ctions within boundary performance characteristics for verifying an object classification or identifying an object misclassification error.

The reference similarity measure sequences represent expected true positive detections and expected false positive detections within boundary performance characteristics for correct object classification associated with the selected reference object class $\mathbf{110}_m$.

The similarity measure may be an earth mover distance (EMD) measure. For example, an EMD measure represents an amount of work needed to transform one distribution into another distribution when measuring distance in an embedding space between components that belong to the same object type. In alternate embodiments, other distribution-based distances (such as Wasserstein distance, or any other similarity measures such as L1 norm and L2 norm distances) may also be used where the distance between components that belong to the same object type should be a low distance to provide a measure of uncertainty or certainty when verifying object classification from an object detector.

The set of reference object classes $\mathbf{110}_1$ to $\mathbf{110}_M$ together with their respective trained parameters may be used in methods and systems for post-processing an object detector output to verify object classifications that reflect true detections or identify object misclassification errors that reflect false detections. For example, the reference component-based descriptors may be (i) formulated such that each object class is encoded into specific components and (ii) converted into probabilistic signal temporal logic for object detection verification. Perception error evaluation and detection using axioms generated with the probabilistic signal temporal logic may be defined from similarity measures such as earth mover distances. The probabilistic signal temporal logic may be used to learn a discriminative pattern in the histogram of false positives vs. true positives for each object class. Probabilistic signal temporal logic may provide axioms, each of which may be constructed with a single or multiple probes having corresponding statistical analyses. The axioms may provide object misclassification error information with an uncertainty measure through perception error evaluation associated with an object detection or recognition, and may be used to weight uncertainties for decision-making commands in autonomous systems.

In one embodiment, the perception error evaluation may be used to generate object classification verification data that reflects a confidence level for object detection. Also, the detected objects may be verified by their components or parts such that if the components or parts which constitute the object exist, then the likelihood of false-positive detection decreases. Accordingly, the context of detected objects with verified object parts may be used to provide an accurate, robust, and verifiable decision-making process such as safe maneuvering with steering and speed control. For example, an autonomous vehicle may respond to a verified pedestrian object detection to actuate a deceleration maneuver and slow down the vehicle. The object component-descriptors of the detected pedestrian object are generated to identify body parts such as hands, head, legs, to validate whether the detection is correct or is an error, and to generate a confidence measure based on recognized object parts in the pedestrian detection. This confidence measure may be used to steer and accelerate safely with higher confidence.

The verification of an object classification associated with detected object may eliminate false positive detection from being sent to the decision-making control command in an autonomous system. Also, the object classification verification data including error detection results may be used to weight object detections with uncertainty information for perception-based decision makings such as steering and speed control. For example, if a pedestrian object is detected and verified with a high degree of confidence then a self-driving car would react accordingly to control the steering and speed control command such as by slowing down to a stop.

Figure 7:
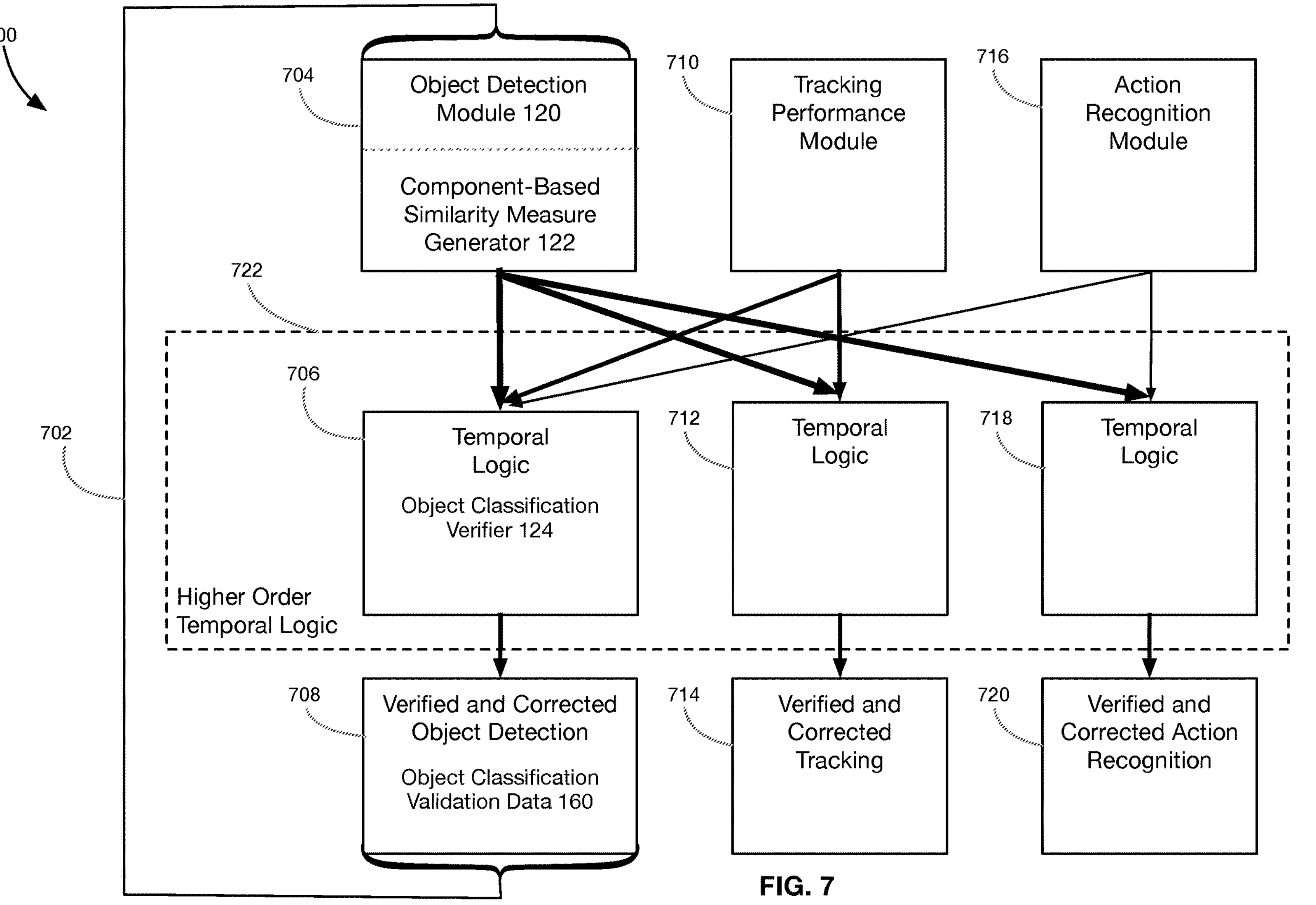
FIG. 7 is an example embodiment of a perception system having an object detection module, a tracking performance module, and an action recognition module, wherein the object detection module is associated with component descriptor similarity detector and a perception object classification validity detector to determine validity and errors for perception object classifications, according to one embodiment.

FIG. 7 is an example of a perception system 700 connected to autonomous decision-making system 126 in autonomous vehicle controller 108 of FIG. 1, according to one embodiment. Perception system 700 may include an object detection module 704 corresponding to object detector 120 and component-based similarity measure generator 122, a temporal logic 706 (of a higher order temporal logic 722) corresponding to object classification verifier 124, and a verified and corrected object detection 708 corresponding to object classification verification data 160 in the embodiment of autonomous vehicle controller 108. For example, component-based similarity measure generator 122 determines object component-descriptors 140 from object localization 136 of detected object 132 in perception data 128. Object component-descriptors 140 may include component probe characteristics that help describe component attributes of detected object 132.

Perception system 700 may further include a conventional tracking performance module 710 and a conventional action recognition module 716. Tracking performance module 710 and recognition module 716 are associated with higher order temporal logic 722. Higher order temporal logic 722 may include temporal logic 706, a temporal logic 712, and a temporal logic 718. Temporal logic 706 may be connected to object detection module 704, tracking performance module 710, and action recognition module 716 for generating verified corrected object detection 708. Temporal logic 712 is connected to object detection module 704 and tracking performance module 710 for generating a verified and corrected tracking 714. Temporal logic 718 is connect to object detection module 704 and action recognition module 716 for generating a verified and corrected action recognition 720. For example, suitable temporal logic is illustrated in commonly assigned and co-pending U.S. patent application Ser. No. 17/030,354 entitled System and Method of Perception Error Evaluation and Correction by Solving Optimization Problems Under the Probabilistic Signal Temporal Logic Based Constraints, filed on Sep. 23, 2020 which is hereby incorporated by reference in its entirety.

Verified and corrected object detection 708, verified and corrected tracking 714, and verified and corrected action recognition 720 are each provided to autonomous decision-making system 126.

Figure 8:
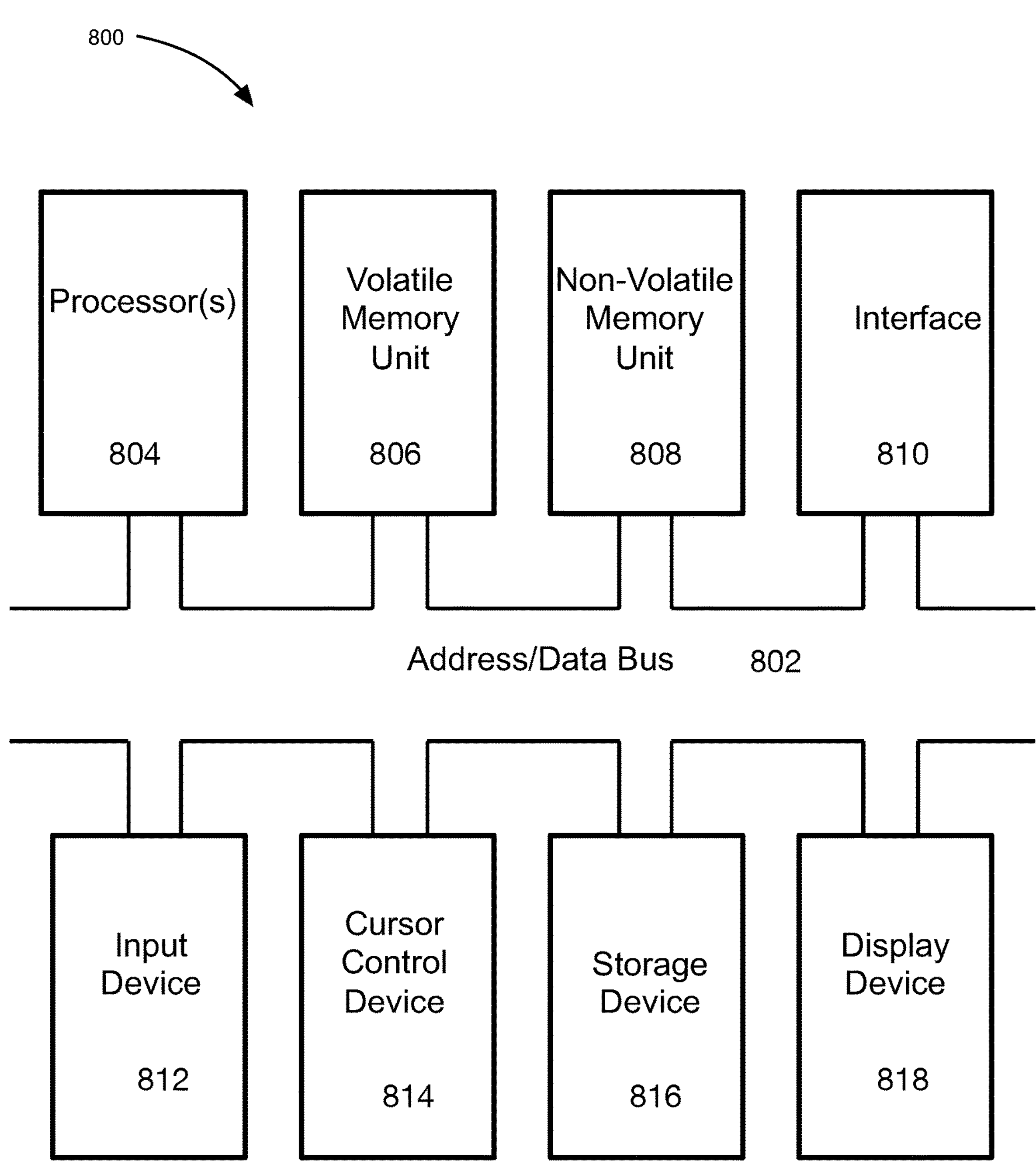
FIG. 8 is a diagram illustrating an example computer architecture that may be used with the embodiments shown in FIGS. 1 through 7, according to one embodiment.

FIG. 8 is a diagram illustrating computer system 800 suitable for implementing the example embodiments in FIGS. 1-7. Computer system 800 is configured to perform calculations, processes, operations, and/or functions associated with a program or algorithm. The processes and steps in the example embodiments may be instructions (e.g., software program) that reside within computer readable memory units and are executed by one or more processors of computer system 800. When executed, these instructions cause computer system 800 to perform specific actions and exhibit specific behavior for the example embodiments disclosed in FIGS. 1-7.

Computer system 800 may include an address/data bus 802 that is configured to communicate information. Additionally, one or more data processing units, such as a processor 804 (or processors), are coupled with address/data bus 802. Processor 804 is configured to process information and instructions. Processor 804 may be a microprocessor. Alternatively, processor 804 may be a parallel processor, application-specific integrated circuit (ASIC), programmable logic array (PLA), complex programmable logic device (CPLD), or a field programmable gate array (FPGA).

Computer system 800 may be configured to utilize one or more data storage units such as a volatile memory unit 806 (e.g., random access memory ("RAM") and static RAM, dynamic RAM, etc.) coupled with address/data bus 802. Volatile memory unit 806 may be configured to store information and instructions for processor 804. Also, computer system 800 may include a non-volatile memory unit 808 (e.g., read-only memory ("ROM"), programmable ROM ("PROM"), erasable programmable ROM ("EPROM"), electrically erasable programmable ROM "EEPROM"), flash memory, etc.) coupled with address/data bus 802. Non-volatile memory unit 808 may be configured to store static information and instructions for processor 804. Alternatively, computer system 100 may execute instructions retrieved from an online data storage unit such as in "Cloud" computing.

Computer system 800 may include one or more interfaces are configured to enable computer system 800 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

Computer system 800 may include an input device 812 coupled with address/data bus 802. Input device 812 may be configured to communicate information and command selections to processor 804. Input device 812 may be an alphanumeric input device, such as a keyboard, that may include alphanumeric and/or function keys. Computer system 800 may include a cursor control device 814 coupled with address/data bus 802, wherein cursor control device 814 is configured to communicate user input information and/or command selections to processor 804. Cursor control device 814 may be implemented using a device such as a mouse, a track-ball, a track-pad, an optical tracking device, or a touch screen. Cursor control device 814 may be directed and/or activated via input from input device 812, such as in response to the use of special keys and key sequence commands associated with input device 812. Alternatively, cursor control device 814 may be configured to be directed or guided by voice commands.

Computer system 800 further may include one or more optional computer usable data storage devices, such as a storage device 816, coupled with the address/data bus 802. Storage device 816 is configured to store information and/or computer executable instructions. Storage device 816 may be a storage device such as a semiconductor storage device, magnetic storage device, or optical storage device. A display device 818 may be coupled with address/data bus 802. Display device 818 may be configured to display video and/or graphics. Display device 818 may include a cathode ray tube ("CRT"), liquid crystal display ("LCD"), field emission display ("FED"), plasma display, or any other display device suitable for displaying video and/or graphic images and alphanumeric characters recognizable to a user.

The processes and steps for the example embodiments in FIGS. 1-7 may be stored as computer-readable instructions on a compatible non-transitory computer-readable medium of a computer program product. Computer-readable instructions include a set of operations to be performed on a computer, and may represent pieces of a whole program or individual, separable, software modules. For example, computer-readable instructions include computer program code (source or object code) and "hard-coded" electronics (i.e. computer operations coded into a computer chip). The computer-readable instructions may be stored on any non-transitory computer-readable medium, such as in the memory of a computer or on external storage devices. The instructions are encoded on a non-transitory computer-readable medium.

A number of example embodiments have been described. Nevertheless, it will be understood that various modifications may be made without departing from the spirit and scope of the devices and methods described herein.

What is claimed is:

1. An autonomous vehicle comprising:

a sensor for providing perception data that captures images of a detected object during a sequence of frames;

a speed and steering control system responsive to a decision-making command to autonomously maneuver the autonomous vehicle; and an autonomous vehicle control system including memory and an autonomous vehicle controller connected to the memory;

wherein:

the memory includes a reference object class that represents the detected object, the reference object class having reference component-descriptors, a reference observation time constraint, and reference temporal similarity measure boundary, wherein the reference component-descriptors include (i) a histogram of reference component-descriptors that represent reference component cluster centroids in an embedded space associated with the reference object class and (ii) an embedding space mapping protocol associated with generating the histogram of reference component-descriptors;

the autonomous vehicle controller includes:

an object detector responsive to each captured image for identifying an object localization of the detected object and generating an object classification associated with the object localization at each frame;

a component-based similarity measure generator configured to generate a sequence of similarity measures associated with the sequence of frames, the component-based similarity measure generator being responsive to the object classification and the object localization at each frame for (i) generating object component-descriptors and (ii) comparing the object component-descriptors with the reference component-descriptors to generate each similarity measure in the sequence of similarity measures, wherein the object component-descriptors include a histogram of object component-descriptors that represent object component locations in the embedded space associated with the reference object class:

an object classification verifier that compares the sequence of similarity measures generated within the reference observation time constraint to the reference temporal similarity measure boundary for generating object classification verification data associated with the object classification; and an autonomous decision-making system responsive to the object classification verification data for generating a decision-making command.

2. An autonomous vehicle according to claim 1, wherein the reference component-descriptors (i) define components of an object classification label associated with the generated object classification and (ii) include a reference embedding space mapping protocol for generating object component-descriptors to identify component characteristics from the object localization associated with the generated object classification.

3. An autonomous vehicle according to claim 2, wherein the component-based similarity measure generator includes an object component-descriptor detector responsive to the object classification for selecting the reference embedding space mapping protocol to generate the histogram of object component-descriptors from the object localization at each frame.

4. An autonomous vehicle according to claim 2, wherein the component-based similarity measure generator includes a component-descriptor comparator that generates the similarity measure as a cumulative difference between the object component-descriptors and the reference component-descriptors.

5. An autonomous vehicle according to claim 1, wherein:

the histogram of reference component-descriptors is a histogram of N reference component-descriptors $Y_1$ through $Y_N$ that represent N reference component cluster centroids in the embedded space associated with the reference object class;

the histogram of object component-descriptors is a histogram of N object component-descriptors $X_1$ through $X_N$ that represent N object component locations in the embedded space associated with the reference object class; and the embedding space mapping protocol generates the histogram of N object component-descriptors $X_1$ through $X_N$ from the object localization at each frame.

6. An autonomous vehicle according to claim 5, wherein:

the component-based similarity measure generator includes a component-descriptor comparator that generates the similarity measure as a cumulative difference function between the object component-descriptors $X_1$ through $X_N$ and the reference component-descriptors $Y_1$ through $Y_N$, and the cumulative difference function is:

$$\text{similarity measure} = \sum_{i=1}^{N} |X_i - Y_i|$$

7. An autonomous vehicle according to claim 1, wherein:

the memory includes a set of reference object classes, each reference object class in the set of reference object classes having an associated set of reference component-descriptors, a reference observation time constraint, and a reference temporal similarity measure boundary; and the component-based similarity generator is responsive to an object classification label associated with the generated object classification for selecting a reference object class from the set of reference object classes.

8. An autonomous vehicle according to claim 1, wherein the object detector generates a classification confidence value associated with the object classification, and transmits the object classification to the component-based similarity measure generator when the classification confidence value satisfies a classification confidence threshold.

9. An autonomous vehicle according to claim 1, wherein:

the sequence of frames has a current frame and prior frames;

the reference observation time constraint an observation start time $S_{tart}$ and an observation end time $t_{end}$;

the object classification verification data represents a validation measurement for the object classification at the current frame, the validation measurement is a comparison of (i) the sequence of similarity measures associated with the detected object at the current frame and the prior frames within the observation start time tstart and the observation end time $t_{end}$ and (ii) the reference temporal similarity measure boundary associated with the reference object class.

10. An autonomous vehicle according to claim 9, wherein:

the validation measurement for the object classification at the current frame is determined from combined similarity measures and probabilistic signal temporal logic constraints based on (i) the sequence of similarity measures during the current frame and the prior frames within reference observation time constraint; and (ii) the reference temporal similarity boundary associated with the reference object class;

the validation measurement represents a verified classification at the current frame when the sequence of similarity measures associated with the detected object during the reference observation time constraint is within the reference temporal similarity measure boundary; and the validation measurement represents a misclassification at the current frame when the sequence of similarity measures associated with the detected object during the reference observation time constraint are not within the reference temporal similarity measure boundary.

11. An autonomous vehicle according to claim 10, wherein the combined similarity measures with probabilistic signal temporal logic constraints are generated as follows:

$$\forall z, Pr\left(SM\left(z, t_{start}:t_{end}\right) \leq \text{SM\_boundary} \rightarrow \text{the reference object class}\right)$$

where:

Pr (·) is a predicate;

SM (z, $t_{start}$, $t_{end}$) is the observation z of the sequence of similarity measures SM during a sequence of frames including the current frame and the prior frames within the reference observation time constraint associated with the reference object class $\mathbf{110}_1$;

SM_boundary represents performance characteristics from reference similarity measure sequences within the reference observation time constraint for the selected reference object class, where the performance characteristics reflect verified object detection characteristics for instances of similarity measure sequencies within time constraint associated with reference object class; and the symbol "≤" refers to SM (z, $t_{start}$, $t_{end}$) being within SM_boundary for determining the validation measurement associated with object classification at the current frame.

12. An autonomous vehicle according to claim 1, wherein the validation measurement for the object classification is a verified classification when the sequence of similarity measures associated with the detected object at the current frame and the prior frames during the reference observation time constraint is within the reference temporal similarity measure boundary associated with the reference object class.

13. A method for verifying object classification in a perception system, the method comprising the steps of:

storing a reference object class including reference component-descriptors, a reference observation time constraint, and a reference temporal similarity measure boundary, wherein the reference component-descriptors include (i) a histogram of reference component-descriptors that represent reference component cluster centroids in an embedded space associated with the reference object class and (ii) an embedding space mapping protocol associated with generating the histogram of reference component-descriptors;

receiving perception data from a sensor that captures images of a detected object during a sequence of frames;

identifying an object localization of the detected object in response to each captured image and generating an object classification associated with the object localization at each frame;

generating a sequence of similarity measures associated with the sequence of frames, wherein the step of generating the sequence of similarity measures is responsive to the object classification and the object localization for (i) generating object component-descriptors and (ii) comparing the object component-descriptors with the reference component-descriptors to generate each similarity measure in the sequence of similarity measures, wherein the object component-descriptors include a histogram of object component-descriptors that represent object component locations in the embedded space associated with the reference object class;

comparing the sequence of similarity measures generated within the reference observation time constraint to the reference temporal similarity measure boundary for generating object classification verification data associated with the object classification;

generating a decision-making command in response to the object classification verification data; and controlling the perception system in response to the decision-making command.

14. A method of verifying object classification in a perception system according to claim 13, wherein the reference component-descriptors (i) define components of an object classification label associated with the generated object classification and (ii) include a reference embedding space mapping protocol for generating object component-descriptors to identify component characteristics from the object localization associated with the generated object classification.

15. A method of verifying object classification in a perception system according to claim 14, wherein the method further comprising:

selecting the reference embedding space mapping protocol in response to the object classification to generate the histogram of object component-descriptors from the object localization at each frame.

16. A method of verifying object classification in a perception system according to claim 14, wherein the method further comprising:

generating the similarity measure as a cumulative difference between the object component-descriptors and the reference component-descriptors.

17. A method of verifying object classification in a perception system according to claim 13, wherein:

the histogram of reference component-descriptors is a histogram of N reference component-descriptors $Y_1$ through $Y_N$ that represent N reference component cluster centroids in the embedded space associated with the reference object class;

the histogram of object component-descriptors is a histogram of N object component-descriptors $X_1$ through $X_N$ that represent N object component locations in the embedded space associated with the reference object class; and the embedding space mapping protocol generates the histogram of N object component-descriptors $X_1$ through $X_N$ from the object localization at each frame.

18. A method of verifying object classification in a perception system according to claim 17, wherein the method further comprising:

generating the similarity measure as a cumulative difference function between the object component-descriptors $X_1$ through $X_N$ and the reference component-descriptors $Y_1$ through $Y_N$, and the cumulative difference function is:

$$\text{similarity measure} = \sum_{i=1}^{N} |X_i - Y_i|$$

19. A method of verifying object classification in a perception system according to claim 13, wherein:

the memory includes a set of reference object classes, each reference object class in the set of reference object classes having an associated set of reference component- descriptors, a reference observation time constraint, and a reference temporal similarity measure boundary; and the component-based similarity generator is responsive to an object classification label associated with the generated object classification for selecting a reference object class from the set of reference object classes.

20. A method of verifying object classification in a perception system according to claim 13, wherein the method further comprising:

generating a classification confidence value associated with the object classification; and generating the sequence of similarity measures when the classification confidence value satisfies a classification confidence threshold.

21. A method of verifying object classification in a perception system according to claim 13, wherein:

the sequence of frames has a current frame and prior frames;

the reference observation time constraint an observation start time $t_{start}$ and an observation end time $t_{end}$;

the object classification verification data represents a validation measurement for the object classification at the current frame, the validation measurement is a comparison of (i) the sequence of similarity measures associated with the detected object at the current frame and the prior frames within the observation start time $t_{start}$ and the observation end time $t_{end}$ and (ii) the reference temporal similarity measure boundary associated with the reference object class.

22. A method of verifying object classification in a perception system according to claim 21, wherein:

the validation measurement for the object classification at the current frame is determined from combined similarity measures and probabilistic signal temporal logic constraints based on (i) the sequence of similarity measures during the current frame and the prior frames within reference observation time constraint; and (ii) the reference temporal similarity boundary associated with the reference object class;

the validation measurement represents a verified classification at the current frame when the sequence of similarity measures associated with the detected object during the reference observation time constraint is within the reference temporal similarity measure boundary; and the validation measurement represents a misclassification at the current frame when the sequence of similarity measures associated with the detected object during the reference observation time constraint are not within the reference temporal similarity measure boundary.

23. A method of verifying object classification in a perception system according to claim 22, wherein the combined similarity measures with probabilistic signal temporal logic constraints are generated as follows:

$$\forall z,\ Pr\big(SM(z, t_{start}:t_{end}) \leq \text{SM\_boundary} \rightarrow \text{the reference object class}\big)$$

where:

Pr (·) is a predicate;

SM (z, $t_{start}$, $t_{end}$) is the observation z of the sequence of similarity measures SM during a sequence of frames including the current frame and the prior frames within the reference observation time constraint associated with the reference object class $110_1$;

SM_boundary represents performance characteristics from reference similarity measure sequences within the reference observation time constraint for the selected reference object class, where the performance characteristics reflect verified object detection characteristics for instances of similarity measure sequencies within time constraint associated with reference object class; and the symbol "≤" refers to SM (z, $t_{start}$, $t_{end}$) being within SM_boundary for determining the validation measurement associated with object classification at the current frame.

24. A method of verifying object classification in a perception system according to claim 13, wherein the validation measurement for the object classification is a verified classification when the sequence of similarity measures associated with the detected object at the current frame and the prior frames during the reference observation time constraint is within the reference temporal similarity measure boundary associated with the reference object class.

25. The method of verifying object classification in a perception system according to claim 13, wherein the perception system is embedded in an autonomous vehicle that includes a (i) sensor and (ii) a speed and steering control system, and the step of controlling the perception system includes controlling the speed and control system in response to the decision-making command for autonomously maneuvering the autonomous vehicle.

26. The method of verifying object classification in a perception system according to claim 13, wherein the perception system is embedded in an autonomous aviation security system that includes a surveillance system, and the step of controlling the perception system includes controlling the surveillance system in response to the decision-making command for autonomously controlling the aviation security system.

27. A method of training component-based descriptors and temporal similarity measures to verify object classification in an object detector, the method comprising the steps of:

generating reference component-descriptors for a selected object class by performing the steps of: (i) selecting a first set of images having an object associated with the selected object class from a benchmark dataset; (ii) mapping component patches from detected objects in the first set of images to an embedding space with a selected number of N clusters having maximum inter-cluster variations and discriminative visual appearance; and (iii) generating a set of N reference component-descriptors in response to the N clusters;

determining a similarity measure threshold in response to the reference component-descriptors by performing the steps of: (i) selecting a second set of images having an object associated with the selected object class from the benchmark dataset; (ii) mapping component patches from detected objects to an embedding space defining a set of N training component-descriptors for each detected object; (iii) generating similarity measures between each set of N training component-descriptors and the reference set of n component-descriptors; and (iv) determining a reference similarity measure threshold for identifying similarity measures associated with expected true positive detections and similarity measures associated with expected false positive detections; and validating an observation time constraint for a reference similarity measure boundary by performing the steps of: (i) selecting a set of video sequences with images having an object associated with the selected object class from the benchmark dataset; (ii) selecting a time constraint having an observation start time $t_{start}$ and an observation end time $t_{end}$; (iii) mapping component patches from detected objects to an embedding space defining a set of N validation component-descriptors for each detected object during the observation start time $t_{start}$ and the observation end time $t_{end}$; (iv) determining a temporal similarity measure boundary based on performance characteristics from similarity measures sequences within the time constraint; and (v) comparing the sequences of generated similarity measures to ground truth data for the selected object class to determine accuracy of time constraint, wherein:

if the accuracy of time constraint satisfies a validating threshold target, then store training parameters in memory for the selected object class; and if the accuracy of time constraint does not satisfy the validating threshold target, then adjust the time constraint and repeat steps for validating the observation time constraint.

28. The method of training component-based parameters according to claim 27, wherein the step of generating reference component-descriptors includes:

a. for each image in the first set of images, (i) detecting the object associated with the selected object class; (ii) extracting patches from the detected object; and (iii) mapping extracted patches to an embedding space with a clustering criterion and a selected number of N clusters that maximizes inter-cluster variations and discriminative visual appearance of reference component descriptor clusters in embedded space, the cluster criterion is defined by an embedding space protocol associated with reference component descriptor clusters; and b. generating a reference set of N component-descriptors Y1 to YN in response to the N clusters having component cluster centroids for detected objects having the selected object class.

29. The method of training component-based parameters according to claim 27, the step of determining a similarity measure threshold includes:

a. for each image in the second set of images, (i) detecting the object associated with the selected object class; (ii) extracting patches from the detected object; (iii) using the embedding space protocol to determine a set of N training component descriptors $X_1$ to $X_N$ from the extracted patches; (iv) generating a similarity measure between the training component descriptors $X_1$ to $X_{N \cdot n}$ and the reference component descriptors $Y_1$ to $Y_N$; and (v) compiling a distribution of similarity measures representing a likelihood of possible similarity measures for the detected object;

b. selecting a reference similarity measure threshold for a threshold boundary defining the similarity measures associated with expected true positive detections and the similarity measures associated with expected false positive detections.

30. The method of training component-based parameters according to claim 27, the step of validating the time constraint includes:

a. selecting the time constraint;

b. for each video sequence during the time constraint, (i) detecting the object associated with the selected object class; (ii) extracting patches from the detected object; (iii) using the embedding mapping space protocol to determine another set of N validation component descriptors $X_1$ to $X_N$ from the extracted patches; (iv) generating a similarity measure between the training component descriptors $X_1$ to $X_{N \cdot n}$ and the reference component descriptors $Y_1$ to $Y_N$;

and (v) compiling a distribution of similarity measures representing a likelihood of possible similarity measures for each detected object during the time constraint;

c. determining a temporal similarity measure boundary based on performance characteristics from similarity measures sequences within the time constraint; e; and d. comparing the sequences of generated similarity measures to ground truth data for the selected object class to determine accuracy of the time constraint t_s to t_e, wherein:

if the accuracy of time constraint satisfies a validating threshold target, then store training parameters in memory for the selected object class; and if the accuracy of time constraint does not satisfy the validating threshold target, then adjust the time constraint and repeat steps for validating the observation time constraint.

* * * * *